(12) United States Patent
Ito et al.

(10) Patent No.: US 12,007,253 B2
(45) Date of Patent: Jun. 11, 2024

(54) ROTATION ANGLE DETECTING DEVICE AND ELECTRIC ACTUATOR

(71) Applicant: NIDEC TOSOK CORPORATION, Kanagawa (JP)

(72) Inventors: Yosuke Ito, Kanagawa (JP); Toshiaki Nakamura, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 423 days.

(21) Appl. No.: 17/348,789

(22) Filed: Jun. 16, 2021

(65) Prior Publication Data

US 2021/0396551 A1 Dec. 23, 2021

(30) Foreign Application Priority Data

Jun. 17, 2020 (JP) ................. 2020-104633

(51) Int. Cl.
*G01D 5/14* (2006.01)
*G01B 7/30* (2006.01)
*H02K 11/215* (2016.01)

(52) U.S. Cl.
CPC ............. *G01D 5/145* (2013.01); *G01B 7/30* (2013.01); *H02K 11/215* (2016.01)

(58) Field of Classification Search
CPC .. G01D 5/145; G01D 2205/40; G01D 5/2451; G01B 7/30; H02K 11/215
See application file for complete search history.

(56) References Cited

U.S. PATENT DOCUMENTS

| | | | | |
|---|---|---|---|---|
| 2001/0033231 A1* | 10/2001 | Matsui | ................... | G01D 5/145 340/672 |
| 2003/0020468 A1* | 1/2003 | Kato | ........................ | G01D 3/02 324/207.2 |
| 2010/0001721 A1* | 1/2010 | Inotsuka | ................ | G01D 5/145 324/207.25 |
| 2014/0184204 A1* | 7/2014 | Kouno | ................... | G01B 7/003 324/207.13 |

FOREIGN PATENT DOCUMENTS

JP 2003149000 5/2003

* cited by examiner

*Primary Examiner* — Bernard Rojas

(74) *Attorney, Agent, or Firm* — JCIPRNET

(57) ABSTRACT

An aspect of the disclosure provides a rotation angle detecting device capable of detecting a rotation angle of a rotation body rotatable about a central axis. The rotation angle detecting device includes: a sensor magnet, having multiple magnetic poles provided side-by side in a circumferential direction about the central axis and installed to the rotation body; a magnetic sensor, overlapped with the sensor magnet when viewed in a predetermined first direction and capable of detecting a magnetic field of the sensor magnet; and a pair of magnetic parts, provided to sandwich the magnetic sensor in a second direction intersecting the first direction.

7 Claims, 10 Drawing Sheets

ROTATION ANGLE DETECTING DEVICE AND ELECTRIC ACTUATOR

CROSS REFERENCE TO RELATED APPLICATIONS

The present invention claims priority under 35 U.S.C. § 119 to Japanese Application No. 2020-104633 filed on Jun. 17, 2020 the entire content of which is incorporated herein by reference.

TECHNICAL FIELD

The invention relates to a rotation angle detecting device and an electric actuator.

BACKGROUND

A rotation angle detecting device capable of detecting a rotation angle of a rotation body by detecting a magnetic field of a sensor magnet installed to the rotation body by using a magnetic sensor is known, such as a rotation angle sensor using a Hall element as a magnetic sensor.

There is a case in which the rotation angle detecting device, for example, detects magnetic flux densities of the sensor magnet in two directions by using the magnetic sensor, and detects the rotation angle of the rotation body based on a value of arctan of a composite vector obtained by combining vectors of the detected magnetic flux densities of the two directions. In such case, if the value of arctan of the composite vector changes linearly with respect to the rotation angle, the rotation angle of the rotation body may be easily and accurately obtained from the value of arctan of the composite vector.

However, depending on the arrangement relationship between the magnetic sensor and the sensor magnet, there may be a direction in which the magnetic flux passes through the magnetic sensor easily and a direction in which the magnetic flux has difficulty in passing through the magnetic sensor. In such case, a significant bias in the magnetic flux densities of the two directions detected by the magnetic sensor is generated, and the value of arctan in the composite vector may change from a linear form to a greatly distorted form with respect to the rotation angle of the rotation body. In such case, the rotation angle detecting device detects the rotation angle of the rotation body by performing a correction process with respect to the value of the magnetic flux density detected by the magnetic sensor. However, as the correction processing amount increases, the error of the detected rotation angle of the rotation body may increase easily, and the detection accuracy of the rotation angle detecting device may decrease.

SUMMARY

An exemplary aspect of the disclosure provides a rotation angle detecting device capable of detecting a rotation angle of a rotation body rotatable about a central axis. The rotation angle detecting device includes: a sensor magnet, having a plurality of magnetic poles provided side-by side in a circumferential direction about the central axis and installed to the rotation body; a magnetic sensor, overlapped with the sensor magnet when viewed in a predetermined first direction and capable of detecting a magnetic field of the sensor magnet; and a pair of magnetic parts, provided to sandwich the magnetic sensor in a second direction intersecting the first direction.

An aspect of the disclosure provides an electric actuator including the rotation angle detecting device.

BRIEF DESCRIPTION OF THE DRAWINGS

The above and other elements, features, steps, characteristics and advantages of the present disclosure will become more apparent from the following detailed description of the preferred embodiments with reference to the attached drawings.

DESCRIPTION OF THE EMBODIMENTS

In each figure, the Z-axis direction is a vertical direction with the positive side as the upper side and the negative side as the lower side. The axial direction of the central axis J1 approximately shown in each figure is parallel to the Z-axis direction, that is, the vertical direction. In the following description, the direction parallel to the axial direction of the central axis J1 is simply referred to as "axial direction Z". Further, the X-axis direction and the Y-axis direction appropriately shown in each figure are horizontal directions orthogonal to the axial direction Z, and are directions orthogonal to each other. In the following description, a direction parallel to the X-axis direction is referred to as "horizontal direction X", and a direction parallel to the Y-axis direction is referred to as "horizontal direction Y".

Further, the radial direction with the central axis J1 as the center is simply referred to as "radial direction", and the circumferential direction centered on the central axis J1 is simply referred to as "circumferential direction". The vertical direction, the horizontal direction, the upper side, and the lower side are simply names for explaining the relative positional relationship of each part, and the actual arrangement relationship, etc., may also be an arrangement relationship other than the arrangement relationship, etc. indicated by these names.

Figure 1:
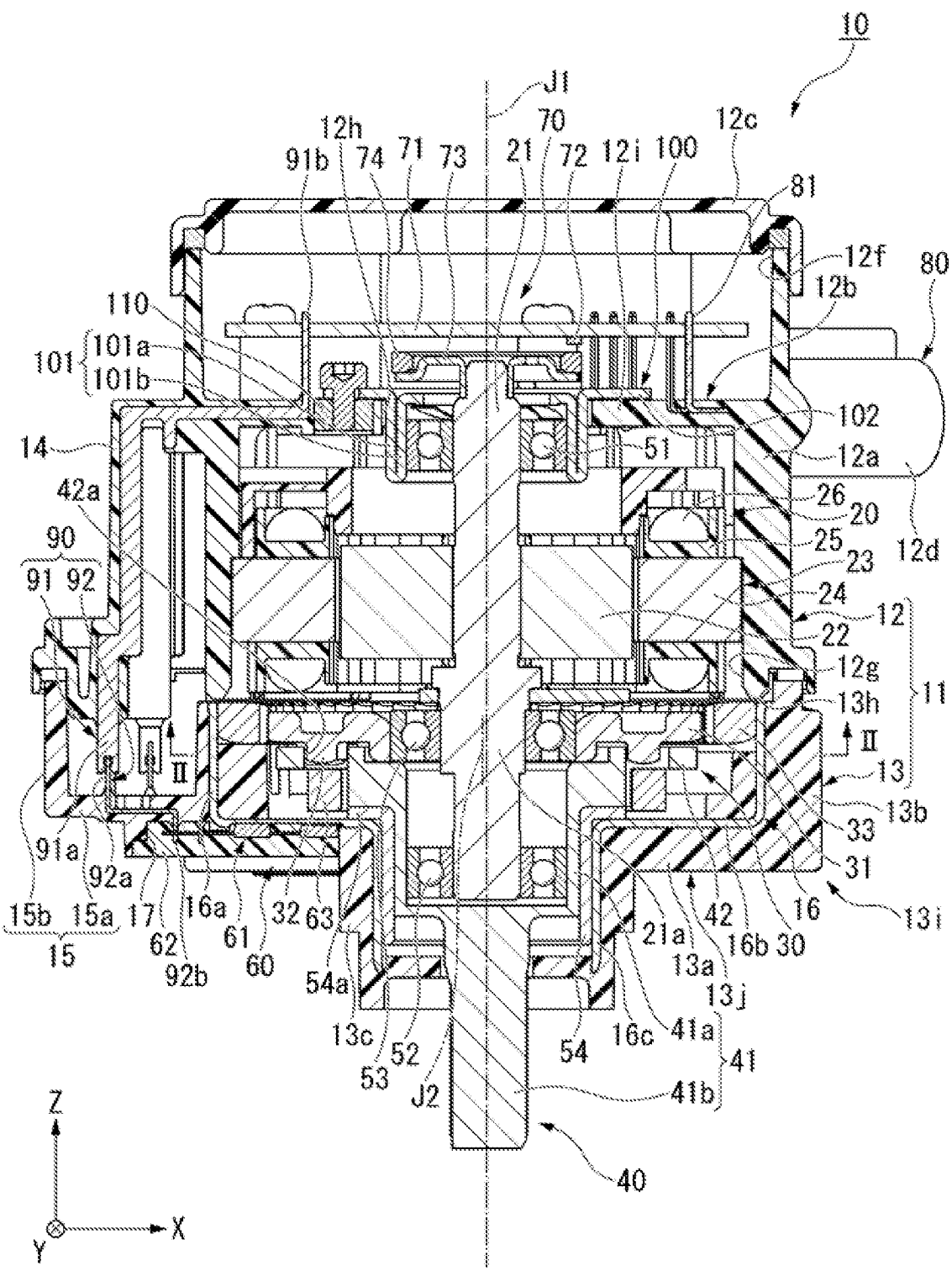
FIG. 1 is a cross-sectional view illustrating an electric actuator according to an exemplary embodiment of the present disclosure.

As shown in FIG. 1, an electric actuator 10 of the exemplary embodiment of the present disclosure includes a case 11, a bearing holder 100, a motor 20 having a motor shaft 21 extending in the axial direction Z of the central axis J1, a controller 70, a connector 80, a deceleration mechanism 30, an outputter 40, wirings 90, a rotation angle detecting device 60, a first bearing 51, a second bearing 52, a third bearing 53, and a bush 54. The first bearing 51, the second bearing 52, and the third bearing 53 are, for example, ball bearings.

The case 11 accommodates the motor 20 and the deceleration mechanism 30. The case 11 has a motor case 12 accommodating the motor 20 and a deceleration mechanism case 13 accommodating the deceleration mechanism 30. The motor case 12 has a case tube 12a, a wall 12b, a control substrate accommodator 12f, an upper cover 12c, a terminal holder 12d, and a first wiring holder 14. Except for a metal member 110 to be described afterwards, the respective parts of the motor case 12 are made of resin.

The case tube 12a is in a cylindrical or substantially cylindrical shape extending in the axial direction Z with the central axis J1 as the center. The case tube 12a is open on both sides of the axial direction Z. The case tube 12a has a first opening 12g open on the lower side. That is, the motor case 12 has the first opening 12g. The case tube 12a surrounds the radially outer side of the motor 20.

The wall 12b is in an annular or substantially annular shape expanding from the inner circumferential surface of the case tube 12a toward the radially inner side. The wall 12b covers the upper side of a stator 23, which will be described afterwards, of the motor 20. The wall 12b has a through hole 12h penetrating through the wall 12b in the axial direction Z. In the exemplary embodiment of the present disclosure, the through hole 12h is in a circular or substantially circular shape with the central axis J1 as the center. The inner diameter of the through hole 12h is greater than the outer diameter of a holder tube 101 to be described afterwards. The wall 12b includes a wall body 12i made of resin and the metal member 110 made of metal. The wall body 12i is a portion in an annular or substantially annular shape expanding from the inner circumferential surface of the case tube 12a to the radially inner side.

The metal member 110 is in an annular or substantially annular shape and has an internal thread on the inner circumferential surface. The metal member 110 is, for example, a nut. The metal member 110 is embedded in the wall body 12i. More specifically, the metal member 110 is embedded in the radially inner edge in the wall body 12i. The metal member 110 is positioned at a position closer to the radially outer side than the radially inner side surface of the through hole 12h. The upper side surface of the metal member 110 is positioned higher than the upper side surface of the wall body 12i. The upper side surface of the metal member 110 is a flat surface orthogonal to the axial direction Z. While omitted in the drawings, multiple metal members 110 are provided in the exemplary embodiment of the present disclosure. The multiple metal members 110 are provided at equal intervals around the circumferential direction. Three metal members 110 are provided, for example.

The control substrate accommodator 12f accommodates a portion of a control substrate 71 to be described afterwards. The control substrate accommodator 12f is provided on the radially inner side of the upper portion of the case tube 12a. The bottom surface of the control substrate accommodator 12f is the upper surface of the wall 12b. The control substrate accommodator 12f is open on the upper side. The upper cover 12c is a plate-like cover which blocks the upper-end opening of the control substrate accommodator 12f. The terminal holder 12d protrudes from the case tube 12a toward the radially outer side. The terminal holder 12d is in a cylindrical or substantially cylindrical shape open on the radially outer side. The terminal holder 12d holds a terminal 81 to be described afterwards.

The first wiring holder 14 protrudes from the case tube 12a toward the radially outer side. In FIG. 1, the first wiring holder 14 protrudes from the case tube 12a toward the negative side of the horizontal direction X. The first wiring holder 14 extends in the axial direction Z. The axial position of the upper end of the first wiring holder 14 is approximately the same as the axial position of the wall 12b. The circumferential position of the first wiring holder 14 is, for example, different from the circumferential position of the connector 80.

The deceleration mechanism case 13 is positioned on the lower side of the motor case 12. The deceleration mechanism case 13 has a deceleration mechanism case body 13i and a cylinder 16. The deceleration mechanism case body 13i is made of resin. The deceleration mechanism case body 13i has a bottom wall 13a, a tube 13b, a protruding tube 13c, and a second wiring holder 15. The bottom wall 13a is in an annular or substantially annular shape with the central axis J1 as the center. The bottom wall 13a covers the lower side of the deceleration mechanism 30.

The tube 13b is in a cylindrical or substantially cylindrical shape protruding from the radially outer edge of the bottom wall 13a toward the upper side. The tube 13b is open on the upper side. The upper end of the tube 13b contacts the lower end of the case tube 12a to be fixed. The protruding tube 13c is in a cylindrical or substantially cylindrical shape protruding from the radially inner edge of the bottom wall 13a toward the lower side. The protruding tube 13c is open on both sides of the axial direction.

The second wiring holder 15 protrudes from the tube 13b toward the radially outer side. In FIG. 1, the second wiring holder 15 protrudes from the tube 13b toward the negative side of the horizontal direction X, that is, the same side toward which the first wiring holder 14 protrudes. The second wiring holder 15 is disposed on the lower side of the first wiring holder 14. The second wiring holder 15 is, for example, in a box or substantially box shape which is hollow and open on the upper side. The inside of the second wiring holder 15 is connected with the inside of the tube 13b. The second wiring holder 15 has a bottom wall 15a and a side wall 15b. The bottom wall 15a extends from the bottom wall 13a toward the radially outer side. In FIG. 1, the bottom wall 15a extends from the bottom wall 13a toward the negative side of the horizontal direction X. The sidewall 15b extends from the outer edge of the bottom wall 15a toward the upper side. In the exemplary embodiment of the present disclosure, a bottom 13*j* of the deceleration mechanism case body 13*i* is defined by the bottom wall 13*a* and the bottom wall 15*a*.

The cylinder 16 is in a cylindrical or substantially cylindrical shape extending in the axis direction Z. More specifically, the cylinder member 16 is in a multi-stage cylindrical or substantially multi-stage cylindrical shape open on both sides in the axial direction, with the central axis J1 as the center. The cylinder 16 is made of metal. In the exemplary embodiment of the present disclosure, the cylinder 16 is made of sheet metal. Therefore, the cylinder 16 is able to be made by pressing a metal plate, and the manufacturing cost of the cylinder 16 is able to be reduced. In the exemplary embodiment of the present disclosure, the cylinder 16 is made of a non-magnetic material.

Figure 2:
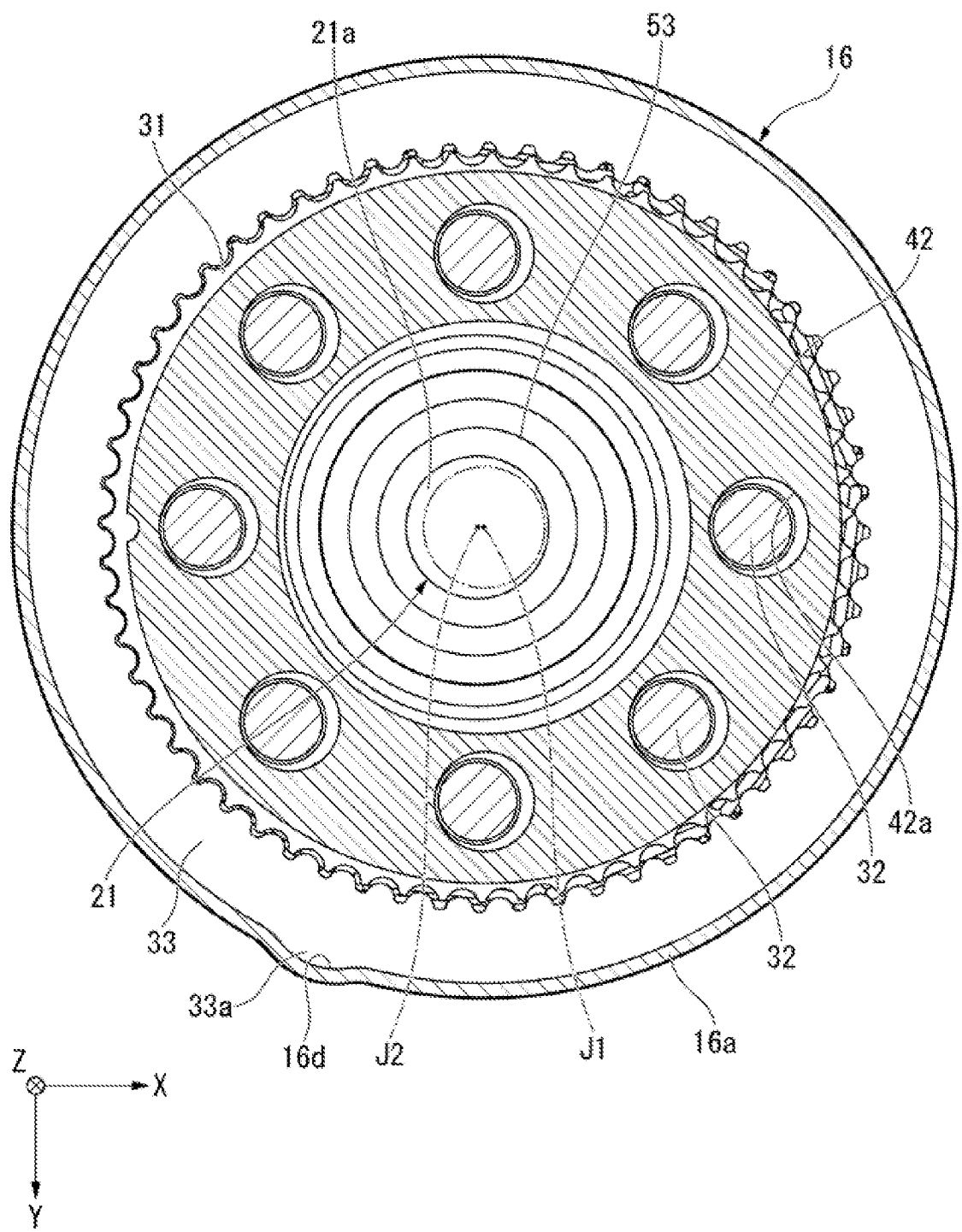
FIG. 2 is a cross-sectional view illustrating a portion of the electric actuator according to the exemplary embodiment of the present disclosure, and is a cross-sectional view taken along II-II in FIG. 1.

The cylinder 16 is embedded in the deceleration mechanism case body 13. The cylinder 16 has a large diameter part 16*a*, an annular part 16*b*, and a small diameter part 16*c*. The large diameter part 16*a* is the upper portion of the cylinder 16. The large diameter part 16*a* is embedded in the tube 13*b*. The upper side end on the inner circumferential surface of the large diameter part 16*a* is exposed to the inside of the deceleration mechanism case 13. As shown in FIG. 2, the large diameter part 16*a* is provided with a positioning recess 16*d* depressed toward the radially outer side on the inner circumferential surface. In FIG. 2, the deceleration mechanism case body 13*i* is omitted from the drawing.

As shown in FIG. 1, the annular part 16*b* is an annular part extending from the lower side end of the large diameter part 16*a* toward the radially inner side. In the exemplary embodiment of the present disclosure, the annular part 16*b* is in an annular or substantially annular shape with the central axis J1 as the center. The annular part 16*b* is disposed on the bottom wall 13*a*. In the exemplary embodiment of the present disclosure, the annular part 16*b* is positioned on the upper side surface of the bottom wall 13*a*. The radially outer edge of the annular part 16*b* is embedded in the tube 13*b*. The portion close to the radially inner side on the upper surface of the annular part 16*b* is exposed to the inside of the deceleration mechanism case 13. The annular part 16*b* covers the lower side of a first magnet 63 to be described afterwards. The upper surface of the annular part 16*b* is, for example, a flat surface orthogonal to the axial direction Z.

Figure 3:
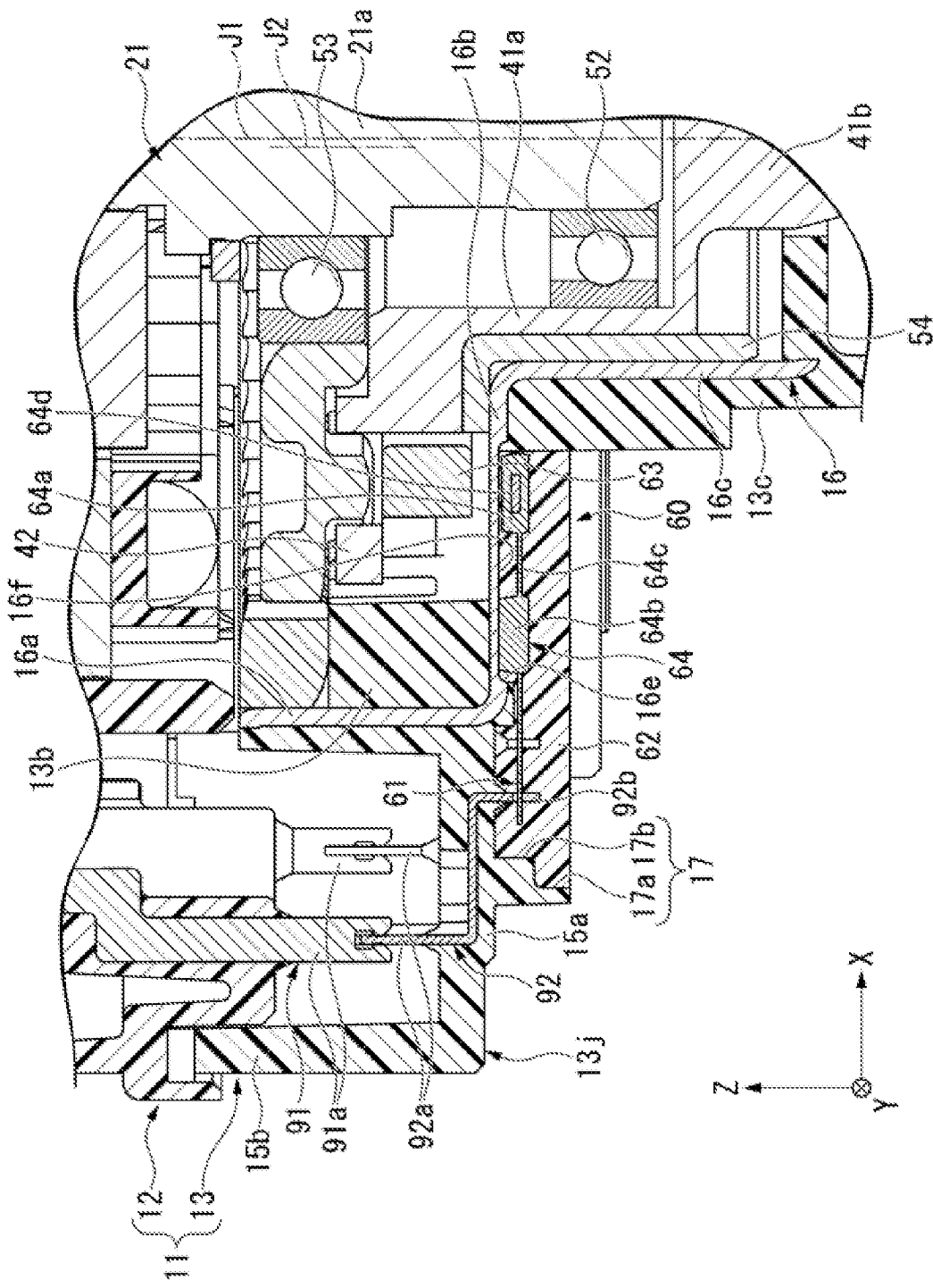
FIG. 3 is a cross-sectional view illustrating a portion of the electric actuator according to the exemplary embodiment of the present disclosure, and is a partially enlarged view of FIG. 1.

As shown in FIG. 3, the annular part 16*b* has a second recess 16*e* depressed from the lower side surface of the annular part 16*b* toward the upper side. The second recess 16*e*, for example, is positioned at a portion on the negative side of the horizontal direction X in the annular part 16*b*. While omitted in the drawings, the inner edge of the second recess 16*e*, when viewed in the axial direction Z, is in a rectangular or substantially rectangular shape extending in the radial direction. The second recess 16*e* in the exemplary embodiment of the present disclosure extends in the horizontal direction X. The second recess 16*e* is positioned on the lower side of the first magnet 63 That is, when viewed in the axial direction Z, the second recess 16*e* is positioned at a position overlapping the first magnet 63. In the exemplary embodiment of the present disclosure, the radially inner side end of the second recess 16*e* is positioned on the lower side of the first magnet 63.

The second recess 16*e*, for example, is created by pressing and crushing a portion of the annular part 16*b* from the lower side toward the upper side. Therefore, the portion where the second recess 16*e* is provided in the annular part 16*b* is pressed and crushed to be thinned. Accordingly, the portion in which the second recess 16*e* is provided in the annular part 16*b* has a smaller dimension than the rest portion of the annular part 16*b* in the axial direction Z.

As shown in FIG. 1, the small diameter part 16*c* is the side lower portion of the cylinder 16. The small diameter part 16*c* extends from the radially inner edge of the annular part 16*b* toward the lower side. The outer diameter and the inner diameter of the small diameter part 16*c* are smaller than the outer diameter and the inner diameter of the large diameter part 16*a*. The small diameter part 16*c* is fitted to the radially inner side of the protruding tube 13*c*. A bush 54 in a cylindrical or substantially cylindrical shape extending in the axial direction Z is provided inside the small diameter part 16*c*. The bush 54, for example, is fit to the small diameter part 16*c* and fixed inside the protruding tube 13*c*. The bush 54 has a bush flange 54*a* protruding toward the radially outer side at the upper end. The bush flange 54*a* contacts the upper surface of the annular part 16*b*. Accordingly, the bush 54 is prevented from falling out toward the lower side from the inside of the small diameter part 16*c*.

The deceleration mechanism case 13 has a second opening 13*h* open on the upper side. In the exemplary embodiment of the present disclosure, the second opening 13*h* is defined by an upper side opening of the tube 13*b* and an upper side opening of the second wiring holder 15. The motor case 12 and the deceleration mechanism case 13 are fixed to each other in a state in which the first opening 12*g* and the second opening 13*h* face each other in the axial direction Z. In the state in which the motor case 12 and the deceleration mechanism case 13 are fixed to each other, the inside of the first opening 12*g* and the inside of the second opening 13*h* are connected to each other.

In the exemplary embodiment of the present disclosure, the motor case 12 and the deceleration mechanism case 13 are respectively provided by insert molding, for example. The motor case 12 provided by insert molding using the metal member 110 and a first wiring 91, which will be described afterwards, of the wirings 90 as insert members. The deceleration mechanism case 13 is provided by insert molding using the cylinder 16 and a second wiring 92, which will be described afterwards, of the wirings 90 as insert members.

As shown in FIG. 3, the case 11 has a first recess 17 positioned on the outer side surface of the case 11. In the exemplary embodiment of the present disclosure, the first recess 17 is provided in the deceleration mechanism case 13. The first recess 17 is depressed from the lower side surface of the bottom 13*j* toward the upper side. In the exemplary embodiment of the present disclosure, the first recess 17 is disposed to straddle the bottom wall 13*a* and the bottom wall 15*a*. The first recess 17 extends in the radial direction. In the exemplary embodiment of the present disclosure, the extending direction of the first recess 17 is a direction parallel to the horizontal direction X in the radial direction. In the exemplary embodiment of the present disclosure, the first recess 17 is overlapped with the second recess 16*e* when viewed in the axial direction Z.

The first recess 17 has a first portion 17*a* depressed from the lower side surface of the bottom 13*j* toward the upper side and a second portion 17*b* depressed from the bottom surface of the first portion 17*a* toward the upper side. The bottom surface of the first portion 17*a* is a surface facing the lower side in the inner side surfaces of the first portion 17*a*. The bottom surface of the second portion 17*b* is a surface facing the lower side in the inner side surfaces of the second portion 17*a*. In the exemplary embodiment of the present disclosure, the bottom surface of the first recess 17 is a surface facing the lower side in the inner side surfaces of the first recess 17, and are defined by the bottom surface of the first portion 17a and the bottom surface of the second portion 17b.

Figure 4:
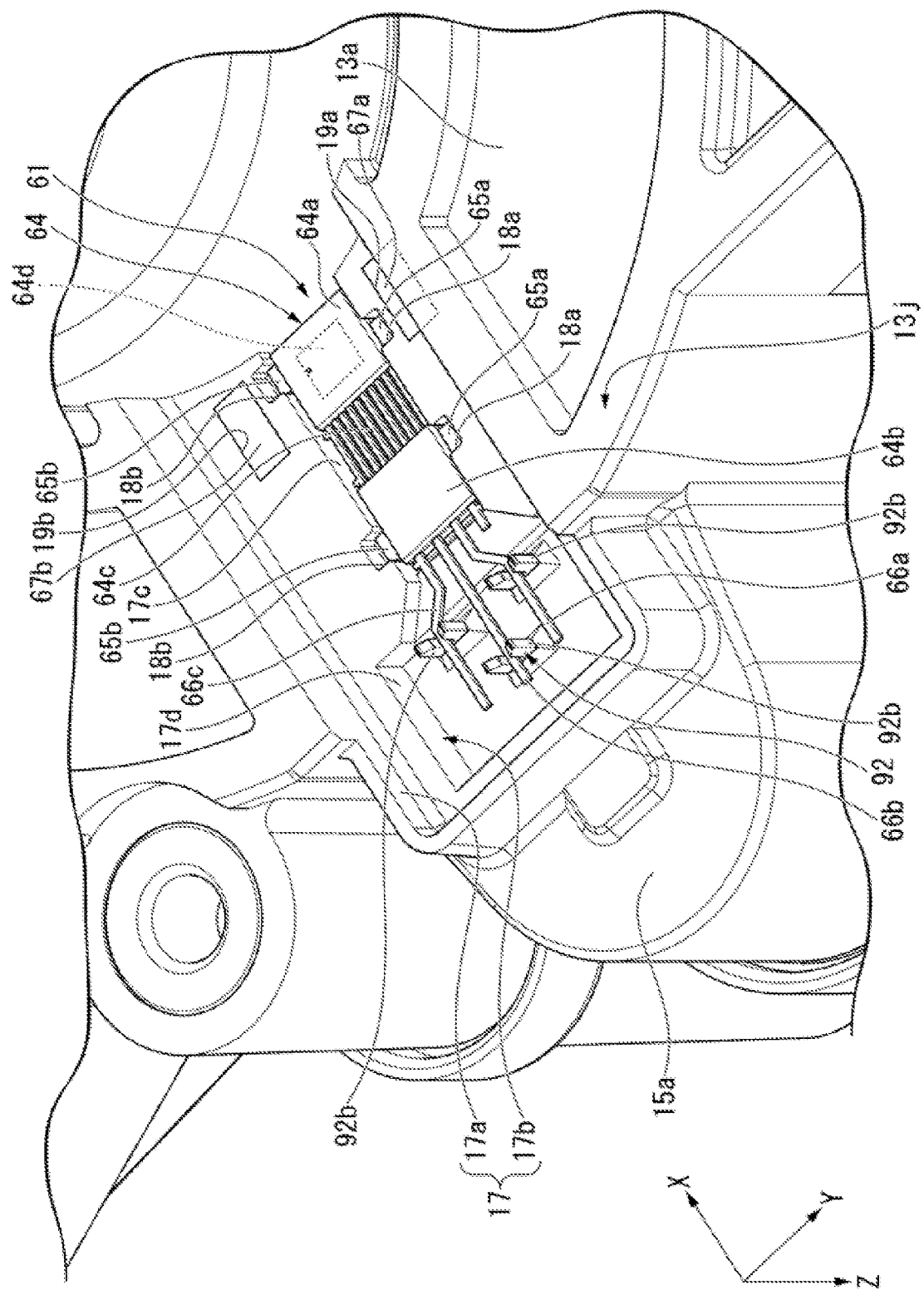
FIG. 4 is a perspective view illustrating a portion of the electric actuator according to the exemplary embodiment of the present disclosure, and illustrates a portion of a rotation angle detecting device.
Figure 5:
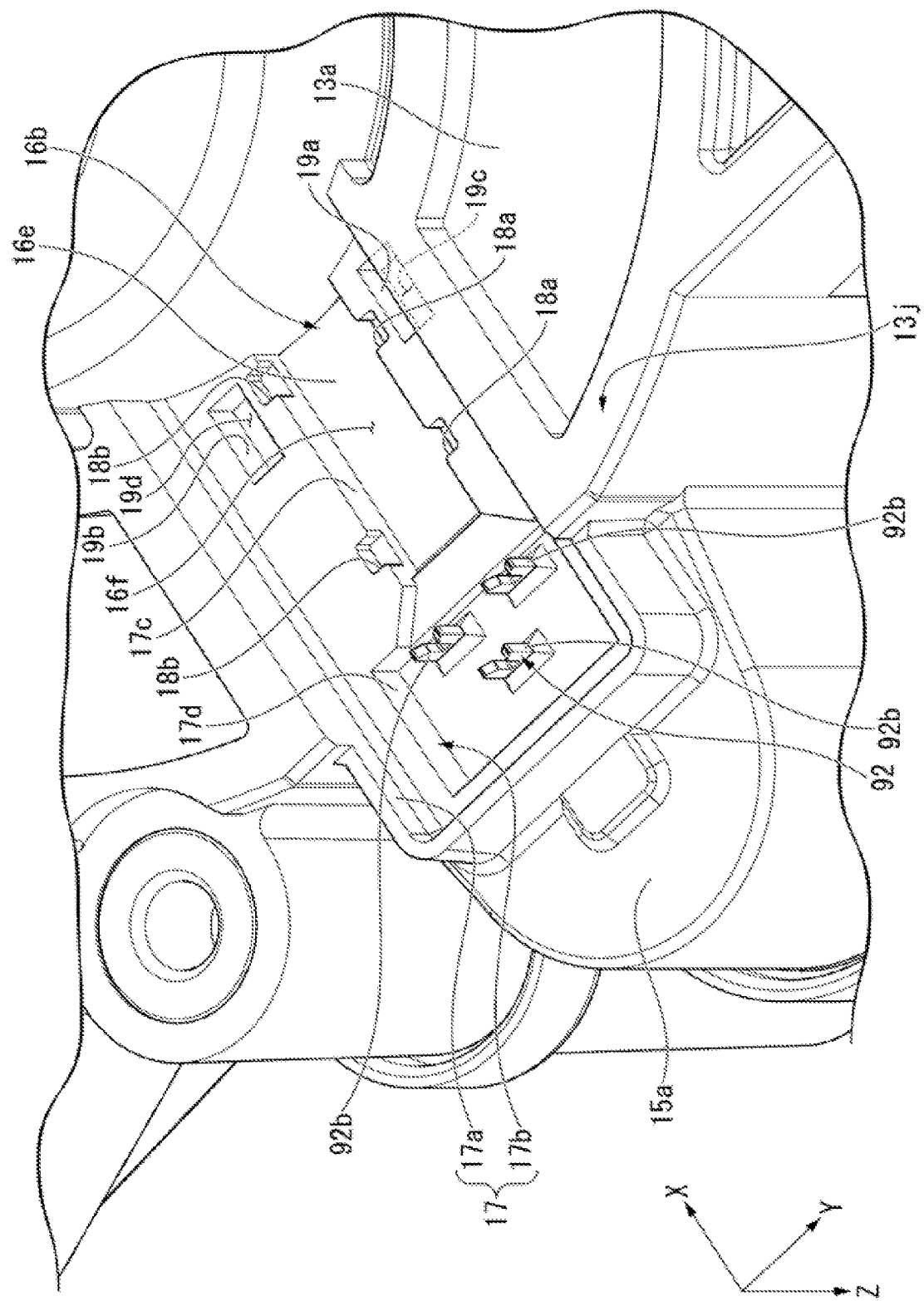
FIG. 5 is a perspective view illustrating a portion of the electric actuator according to the exemplary embodiment of the present disclosure, and illustrates a first recess and an accommodating recess.

As shown in FIG. 4 and FIG. 5, the inner edge of the first portion 17a, when viewed in the axial direction Z, is in a rectangular or substantially rectangular shape longer in the horizontal direction X. The second portion 17b has a body accommodator 17c, a terminal accommodator 17d, a first protrusion accommodator 18a, and a second protrusion accommodator 18b. The body accommodator 17c is a radially inner side end of the second portion 17b in the horizontal direction X. The body accommodator 17c is provided on the bottom wall 13a. A sensor body 64 to be described afterwards is accommodated in the body accommodator 17c. The inner edge of the body accommodator 17c, when viewed in the axial direction Z, is in a rectangular or substantially rectangular shape longer in the horizontal direction X, for example. The body accommodator 17c, for example, when viewed in the axial direction Z, is smaller than the second recess 16e, and is substantially entirely overlapped with the second recess 16e.

As shown in FIG. 5, a bottom surface 16f of the second recess 16e in the annular part 16b is exposed to the body accommodator 17c. The bottom surface 16f is a surface facing the lower side in the inner side surfaces of the second recess 16e. The bottom surface 16f defines the bottom surface of the body accommodator 17c. That is, the bottom surface of the first recess 17 includes the bottom surface of the second recess 16e. The bottom surface 16f, for example, is a flat surface orthogonal to the axial direction Z.

The terminal accommodator 17d is connected to the radially outer side end of the body accommodator 17c in the horizontal direction X. The terminal accommodator 17d is provided on the bottom wall 15a. The inner edge of the terminal accommodator 17d, when viewed in the axial direction Z, is in a rectangular or substantially rectangular shape longer in the horizontal direction Y. The dimension of the terminal accommodator 17d in the horizontal direction Y is greater than the dimension of the body accommodator 17c in the horizontal direction Y. The terminal accommodator 17d is protrusive over the body accommodator 17c on both sides in the horizontal direction Y.

The first protrusion accommodator 18a and the second protrusion accommodator 18b are connected to the body accommodator 17c. The first protrusion accommodator 18a is provided on a side (+Y side) of the body accommodator 17c in the horizontal direction Y. The second protrusion accommodator 18b is provided on the other side (−Y side) of the body accommodator 17c in the horizontal direction Y. The bottom surface of the first protrusion accommodator 18a and the bottom surface of the second protrusion accommodator 18b are positioned lower than the bottom surface 16f of the body accommodator 17c. The bottom surface of the first protrusion accommodator 18a is a surface facing the lower side in the inner side surfaces of the first protrusion accommodator 18a. The bottom surface of the second protrusion accommodator 18b is a surface facing the lower side in the inner side surfaces of the second protrusion accommodator 18b.

Two first protrusion accommodators 18a are provided separately in the horizontal direction X. Two second protrusion accommodators 18b are provided separately in the horizontal direction X. The interval between the two first protrusion accommodators 18a in the horizontal direction X is smaller than the interval between the two second protrusion accommodators 18b in the horizontal direction X. In the horizontal direction X, the positions of the first protrusion accommodators 18a and the positions of the second protrusion accommodators 18b are different from each other.

More specifically, the second protrusion accommodator 18b positioned on the radially outer side in the two second protrusion accommodators 18b is positioned on the radially outer side with respect to the two first protrusion accommodators 18a. In addition, the second protrusion accommodator 18b positioned on the radially inner side in the two second protrusion accommodators 18b is positioned to on the radially inner side with respect to the two first protrusion accommodators 18a.

In the exemplary embodiment of the present disclosure, the case 11 has a pair of accommodating recesses 19a and 19b. The pair of accommodating recesses 19a and 19b are, for example, provided in the deceleration mechanism case 13. The pair of accommodating recesses 19a and 19b are, for example, depressed from the lower side surface of the bottom 13j toward the upper side. The accommodating recesses 19a and 19b are, for example, provided on the sidewall 13a. The pair of accommodating recesses 19a and 19b, when viewed in the axial direction Z, are provided to sandwich the first recess 17. More specifically, the pair of accommodating recesses 19a and 19b are, for example, provided to sandwich the radially inner side end of the body accommodator 17c in the horizontal direction Y.

Of the two first protrusion accommodators 18a, the accommodating recess 19a is positioned on a side (+Y side) in the horizontal direction Y of the first protrusion accommodator 18a positioned on the radially inner side. Of the two second protrusion accommodators 18b, the accommodating recess 19b is positioned on the other side (−Y side) in the horizontal direction Y of the second protrusion accommodator 18b positioned on the radially inner side 18b.

The pair of accommodating recesses 19a and 19b, when viewed in the axial direction Z, is in a rectangular or substantially rectangular shape longer in the horizontal direction X, for example. The entirety of the pair of accommodating recesses 19a and 19b, when viewed in the axial direction Z, is overlapped with the second recess 16e. Inside the pair of accommodating recesses 19a and 19b, for example, the bottom surface 16f of the second recess 16e is exposed. A bottom surface 19c of the accommodating recess 19a and a bottom surface 19d of the accommodating recess 19b, for example, are defined by the bottom surface 16f of the second recess 16e. The bottom surface 19c of the accommodating recess 19a is a surface facing the lower side in the inner surfaces of the accommodating recess 19a. The bottom surface 19d of the accommodating recess 19b is a surface facing the lower side in the inner surfaces of the accommodating recess 19b.

As shown in FIG. 1, the bearing holder 100 is fixed to the motor case 12. The bearing holder 100 is made of metal. In the exemplary embodiment of the present disclosure, the bearing holder 100 is made of sheet metal. Therefore, the bearing holder 100 is able to be made by pressing a metal plate, and the manufacturing cost of the bearing holder 100 is able to be reduced. The bearing holder 100 has the holder tube 101 in a tube or substantially tube shape and a holder flange 102. In the exemplary embodiment of the present disclosure, the holder tube 101 is in a cylindrical or substantially cylindrical shape with the central axis J1 as the center. The holder tube 101 holds the first bearing 51 on the radially inner side. The holder tube 101 is inserted into the through hole 12h. The holder tube 101 protrudes toward the lower side over the wall 12b via the through hole 12h from the inside of the control substrate accommodating part 12f.

The outer diameter of the holder tube 101 is smaller than the inner diameter of the through hole 12h. Therefore, at least a portion of the radially outer side surface of the holder tube 101 in the circumferential direction is positioned at a position closer to the radially inner side than the radially inner side surface of the through hole 12h. In the example shown in FIG. 1, the radially outer side surface of the holder tube 101 is positioned at a position closer to the radially inner side than the radially inner side surface of the through hole 12h throughout the entire circumference.

In the exemplary embodiment of the present disclosure, the holder tube 101 has an outer side tube 101a and an inner side 101b. The outer side tube 101a is in a cylindrical or substantially cylindrical shape extending from the radially inner edge of the holder flange 102 toward the lower side. The radially outer side surface of the outer side tube 101a is the radially outer side surface of the holder tube 101. The inner tube 101b is in a cylindrical or substantially cylindrical shape extending from the lower side end of the outer side tube 101a toward the upper side on the radially inner side of the outer side tube 101a. The radially outer side surface of the inner side tube 101b contacts the radially inner side surface of the outer side tube 101a. Accordingly, by with the holder tube 101 provided by overlapping the two tubes in the radial direction, the strength of the holder tube 101 is able to be facilitated. On the radially inner side of the inner side tube 101b, the first bearing 51 is held. The upper side end of the inner side tube 101b is positioned higher than the first bearing 51. The upper side end of the inner side tube 101b is positioned slightly lower than the upper side end of the outer side tube 101a.

The holder flange 102 extends from the holder tube 101 toward the radially outer side. In the exemplary embodiment of the present disclosure, the holder flange 102 extends from the upper side end of the holder tube 101 toward the radially outer side. The holder flange 102 is in an annular plate shape or a substantially annular plate shape with the central axis J1 as the center. The holder flange 102 is positioned at the upper side of the wall 12b. The holder flange 102 is fixed to the wall 12b. Accordingly, the bearing holder 100 is fixed to the motor case 12.

In the exemplary embodiment of the present disclosure, the holder flange 102 is fixed to the wall 12b by a plurality of screws fastened into the wall 12b in the axial direction Z. In the exemplary embodiment of the present disclosure, the screws fixing the holder flange 102 are fastened into internal threads of the metal member 110 in the wall 12b. While omitted in the drawings, for example, three screws are provided to fix the holder flange 102.

The holder flange 102 fixed by the screws contact the upper side surface of the metal member 110. More specifically, the periphery of the penetration part through which the screws penetrate on the lower side surface of the holder flange 102 contacts the upper side surface of the metal member 110. The holder flange 102 is positioned at a position closer to the upper side than the wall body 12i. Therefore, the holder flange 102 is able to be accurately positioned in the axial direction Z by the metal member 110. In addition, the holder flange 102 is able to be prevented from inclining with respect to the axial direction Z. In addition, the holder flange 102 does not directly contact the wall body 12i. Therefore, even when a difference in thermal deformation amount between the wall body 12i made of resin and the metal member 110 made of metal is generated due to a difference in linear expansion coefficient, a stress is able to be prevented from being applied to the wall body 12i. Accordingly, the wall body 12i is able to be prevented from being damaged, and the metal member 110 is able to be prevented from falling out from the wall body 12i, etc.

The motor 20 has a motor shaft 21, a rotor body 22, and the stator 23. The motor shaft 21 is rotatable about the central axis J1 as the center. The motor shaft 21 is supported by the first bearing 51 and the second bearing 52 to be rotatable about the central axis J1. The first bearing 51 is held by the bearing holder 100 and rotatably supports a portion of the motor shaft 21 closer to the upper side than the rotor body 22. The second bearing 52 supports a portion of the motor shaft 21 lower than the rotor body 22 to be rotatable with respect to the deceleration mechanism case 13.

The upper end of the motor shaft 21 protrudes upward over the wall 12b via the through hole 12h. The motor shaft 21 has an eccentric shaft 21a with an eccentric axis J2, which is eccentric with respect to the central axis J1, as center. The eccentric shaft 21a is positioned lower than the rotor body 22. An inner ring of the third bearing 53 is fit with the eccentric shaft 21a to be fixed.

The rotor body 22 is fixed to the motor shaft 21. While omitted in the drawings, the rotor body 22 has a cylindrical rotor core fixed to the outer circumferential surface of the motor shaft 21 and a magnet fixed to the rotor core. The stator 23 faces the rotor body 22 in the radial direction via a gap. The stator 23 surrounds the rotor body 22 on the radially outer side of the rotor body 22. The stator 23 has a stator core 24 in a ring shape or substantially ring shape surrounding the radially outer side of the rotor body 22, an insulator 25 installed to the stator core 24, and a plurality of coils 26 installed to the stator core 24 via the insulator 25. The stator core 24 is fixed to the inner circumferential surface of the case tube 12a. Accordingly, the motor 20 is held in the motor case 12.

The controller 70 has the control substrate 71, a second mounting member 73, a second magnet 74, and a rotation sensor 72. That is, the electric actuator 10 includes the control substrate 71, the second mounting member 73, the second magnet 74, and the rotation sensor 72.

The control substrate 71, for example, is in a plate or substantially plate shape expanding along a surface orthogonal to the axial direction Z. The control substrate 71 is accommodated in the motor case 12. More specifically, the control substrate 71 is accommodated in the control substrate accommodator 12f, and is provided to be closer to the upper side than the wall part 12b. The control substrate 71 is electrically connected to the motor 20. The coils 26 of the stator 23 are electrically connected to the control substrate 71. The control substrate 71, for example, controls currents supplied to the motor 20. That is, an inverter circuit is mounted on the control substrate 71, for example.

The second mounting member 73 is in an annular or substantially annular shape with the central axis J1 as the center. The inner circumferential surface of the second mounting member 73 is fixed to the upper end of the motor shaft 21. The second mounting member 73 is disposed on the upper side of the first bearing 51 and the bearing holder 100. The second mounting member 73 is, for example, made of a non-magnetic material. Nevertheless, the second mounting member 73 may also be made of a magnetic material.

The second magnet 74 is in an annular or substantially annular shape with the central axis J1 as the center. The second magnet 74 is fixed to the upper end surface of the radially outer edge of the second mounting member 73. How the second magnet 74 is fixed to the second mounting member 73 is not particularly limited. For example, the second magnet 74 may be fixed to the second mounting member 73 through adhesion by an adhesive. The second mounting member 73 and the second magnet 74 are rotatable with the motor shaft 21. The second magnet 74 is disposed on the upper side of the first bearing 51 and the holder tube 101. The second magnet 74 has N poles and S poles alternately provided along the circumferential direction.

The rotation sensor 72 is a sensor capable of detecting the rotation of the motor 20. The rotation sensor 72 is installed to the lower surface of the control substrate 71. The rotation sensor 72 faces the second magnet 74 in the axial direction Z via a gap. The rotation sensor 72 is capable of detecting a magnetic field generated by the second magnet 74. The rotation sensor 72 is a Hall element, for example. While omitted in the drawings, a plurality of rotation sensors 72, such as three rotation sensors 72, are provided along the circumferential direction. By detecting the change of the magnetic field generated by the second magnet 74 rotating with the motor shaft 21, the rotation sensor 72 is able to detect the rotation of the motor shaft 21.

The connector 80 is a part for the connection with electrical wirings outside the case 11. The connector 80 is provided in the motor case 12. The connector 80 has the terminal holder 12d and the terminal 81. The terminal 81 is embedded into the terminal holder 12d to be held. An end of the terminal 81 is fixed to the control substrate 71. The other end of the terminal 81 is exposed to the outside of the case 11 via the inside of the terminal holder 12d. In the exemplary embodiment of the present disclosure, the terminal 81 is, for example, a busbar.

The connector 80 is connected to an external power via an electrical wiring not shown herein. More specifically, an external power is installed to the terminal holder 12d, and an electrical wiring of the external power is electrically connected to a portion of the terminal 81 protruding in the terminal holder 12d. Accordingly, the terminal 81 electrically connects the control substrate 71 and the electrical wiring. Therefore, in the exemplary embodiment of the present disclosure, power is supplied from the external power to the coils 26 of the stator 23 via the terminal 81 and the control substrate 71.

The deceleration mechanism 30 is connected to the motor 20. In the exemplary embodiment of the present disclosure, the deceleration mechanism 30 is provided on the radially outer side of a portion of the lower side of the motor shaft 21. The deceleration mechanism 30 is accommodated inside the deceleration mechanism case 13. The deceleration mechanism 30 is provided between the bottom wall 13a as well as the annular part 16b and the motor 20 in the axial direction Z. The deceleration mechanism 30 has an external gear 31, a plurality of protrusions 32, an internal gear 33, and an output flange 42.

The external gear 31, for example, adopts the eccentric axis J2 of the eccentric shaft 21a as the center, and is in an annular plate shape or a substantially annular plate shape which expands along a surface orthogonal to the axial direction Z. As shown in FIG. 2, a gear part is provided on the radially outer side surface of the external gear 31. The external gear 31 is connected to the eccentric shaft 21a via the third bearing 53. Accordingly, the deceleration mechanism 30 is connected to a portion of the lower side of the motor shaft 21. The external gear 31 is fit with the outer ring of the third bearing 53 from the radially outer side. Accordingly, the third bearing 53 connects the motor shaft 21 and the external gear 31 to be relatively rotatable about the eccentric shaft J2.

As shown in FIG. 1, the protrusions 32 protrude from the external gear 31 toward the output flange 42 in the axial direction Z. The protrusion 32 is in a columnar or substantially columnar shape protruding to the lower side. As shown in FIG. 2, the protrusions 32 are provided along the circumferential direction. More specifically, the protrusions 32 are, for example, provided at equal intervals along the entire circumference in the circumferential direction with the eccentric axis J2 as the center.

The internal gear 33 surrounds the radially outer side of the external gear 31 to be fixed, and is engaged with the external gear 31. The internal gear 33 is, for example, in an annular or substantially annular shape with the central axis J1 as the center. As shown in FIG. 1, the internal gear 33 is positioned on the radially inner side of the upper side end of the cylinder 16. The internal gear 33 is fixed to the inner circumferential surface of the cylinder 16 made of metal. Therefore, the internal gear 33 is able to be firmly fixed to the deceleration mechanism case 13 while the deceleration mechanism case 13 is made of resin. Accordingly, the internal gear 33 is able to be prevented from moving with respect to the deceleration mechanism case 13, and the shifting of the position of the internal gear 33 is able to be suppressed. In the exemplary embodiment of the present disclosure, the internal gear 33 is fixed to the inner circumferential surface of the large diameter part 16a by pressing. Therefore, the deceleration mechanism 30 is fixed to the inner circumferential surface of the cylinder 16 and held in the deceleration mechanism case 13. As shown in FIG. 2, a gear part is provided on the inner circumferential surface of the internal gear 33. The gear part of the internal gear 33 is engaged with the gear part of the external gear 31. More specifically, the gear part of the internal gear 33 is engaged with the gear part of the external gear 31 at a portion.

The internal gear 33 has a positioning projection 33a protruding toward the radially outer side. The positioning projection 33a is fit with the positioning recess 16d provided in the large diameter part 16a. Accordingly, the positioning protrusion 33a is caught in the positioning recess 16d, and the relative rotation of the internal gear 33 with respect to the cylinder 16 in the circumferential direction is able to be suppressed.

The output flange 42 is a portion of the outputter 40. The output flange 42 is positioned on the lower side of the external gear 31. The output flange 42 is in an annular plate shape or a substantially annular plate shape expanding in the radial direction with the central axis J1 as the center. The output flange 42 expands from the upper side end of an output shaft 41 to be described afterwards toward the radially outer side. As shown in FIG. 1, the output flange 42 contacts the bush flange 54a from the upper side.

The output flange 42 has a plurality of holes 42a. In the exemplary embodiment of the present disclosure, the holes 42a penetrate through the output flange 42 in the axial direction Z. As shown in FIG. 2, when viewed in the axial direction Z, the holes 42a are circular. The inner diameter of the hole 42a is greater than the outer diameter of the protrusion 32. The protrusions 32 provided on the external gear 31 are respectively inserted into the respective holes 42a. The outer circumferential surface of the protrusion 32 is inscribed with the inner circumferential surface of the hole 42a. The inner circumferential surface of the hole 42a swingably supports the external gear 31 about the central axis J1 via the protrusion 32. In other words, the protrusions 32 swingably support the external gear 31 about the central axis J1 via the inner side surfaces of the holes 42a.

The outputter 40 is a part which outputs the driving force of the electric actuator 10. As shown in FIG. 1, the outputter 40 is accommodated in the deceleration mechanism case 13. The outputter 40 has the output shaft 41 and the output flange 42. That is, the electric actuator 10 includes the output shaft 41 and the output flange 42. In the exemplary embodiment of the present disclosure, the outputter 40 is a single component.

The output shaft 41 extends in the axial direction Z of the motor shaft 21 on the lower side of the motor shaft 21. The output shaft 41 has a cylindrical part 41a and an output shaft body 41b. The cylindrical part 41a is in a cylindrical or substantially cylindrical shape extending from the inner edge of the output flange 42 toward the lower side. The cylindrical part 41a is in a cylindrical or substantially cylindrical shape having a bottom and open on the upper side. The cylindrical part 41a is fit with the radially inner side of the bush 54. Accordingly, the output shaft 41 is rotatably supported by the cylinder 16 via the bush 54. The deceleration mechanism 30 is fixed to the cylinder 16. Therefore, the cylinder 16 made of metal is able to support the output shaft 41 together with the deceleration mechanism 30. Accordingly, the deceleration mechanism 30 and the output shaft 41 is able to be provided with high axial accuracy.

The second bearing 52 is accommodated inside the cylindrical part 41a. The outer ring of the second bearing 52 is fit with the inside of the cylindrical part 41a. Accordingly, the second bearing 52 connects the motor shaft 21 and the output shaft 41 to be rotatable with each other. The lower end of the motor shaft 21 is positioned inside the cylindrical part 41a. The lower end surface of the motor shaft 21 faces the upper surface of the bottom of the cylindrical part 41a via a gap.

The output shaft body 41b extends from the bottom of the cylindrical part 41a toward the lower side. In the exemplary embodiment of the present disclosure, the output shaft body 41b is in a columnar or substantially columnar shape with the central axis J1 as the center. The outer diameter of the output shaft body 41b is smaller than the outer diameter and the inner diameter of the cylindrical part 41a. The lower end of the output shaft body 41b protrudes toward the lower side over the protruding tube 13c. Another part to which the driving force of the electric actuator 10 is output is installed to the lower end of the output shaft body 41b.

When the motor shaft 21 rotates about the central axis J1, the eccentric shaft 21a revolves around the central axis J1 as the center in the circumferential direction. The revolution of the eccentric shaft 21a is transmitted to the external gear 31 via the third bearing 53, and the external gear 31 swings while the positions where the internal circumferential surfaces of the holes 42a are inscribed with the outer circumferential surfaces of the protrusion 32 change. Therefore, the position where the gear part of the external gear 31 and the gear part of the internal gear 33 are engaged changes in the circumferential direction. Therefore, the rotation force of the motor shaft 21 is transmitted to the internal gear 33 via the external gear 31.

Here, in the exemplary embodiment of the present disclosure, the internal gear 33 is fixed to the deceleration mechanism case 13 and therefore does not rotate. Therefore, due to the reaction force of the rotation force transmitted to the internal gear 33, the external gear 31 rotates about the eccentric axis J2. At this time, the direction in which the external gear 31 rotates becomes the direction opposite to the direction in which the motor shaft 21 rotates. The rotation of the external gear 31 about the eccentric shaft J2 is transmitted to the output flange 42 via the holes 42a and the protrusions 32. Accordingly, the output shaft 41 rotates about the central axis J1. By doing so, the rotation of the motor 20 is transmitted to the outputter 40 via the deceleration mechanism 30.

The rotation of the output shaft 41 is decelerated with respect to the rotation of the motor shaft 21 by the deceleration mechanism 30. According to the deceleration mechanism 30 of the exemplary embodiment of the present disclosure, the deceleration ratio of the rotation of the output shaft 41 with respect to the rotation of the motor shaft 21 is able to be set greater. Therefore, the rotation torque of the output shaft 41 is able to be greater.

The wirings 90 are electrically connected to a magnetic sensor 61 to be described afterwards. In the exemplary embodiment of the present disclosure, the wirings 90 are components for connecting the magnetic sensor 61 of the rotation angle detecting device 60 and the control substrate 71 of the controller 70. In the exemplary embodiment of the present disclosure, the wirings 90 are elongated plate-like busbars. While not shown in the drawings, three wirings 90 are provided in the exemplary embodiment of the present disclosure. The wirings 90 are respectively provided by connecting the first wiring 91 and the second wiring 92.

The first wiring 91 extends from the inside of the second wiring holder 15 to the inside of the control substrate accommodator 12f. A portion of the first wiring 91 is embedded into the first wiring holder 14, the case tube 12a, and the wall body 12i. Accordingly, the first wiring 91 is held in the motor case 12.

A lower end 91a of the first wiring 91 protrudes from the first wiring holder 14 toward the lower side and is positioned inside the second wiring holder 15. An upper end 91b of the first wiring 91 protrudes from the wall body 12i toward the upper side and is connected to the control substrate 71. Accordingly, the first wiring 91 is electrically connected with the control substrate 71, and electrically connected to the electrical wiring outside the case 11 via the connector 80.

A portion of the second wiring 92 is embedded in the bottom 13j. Accordingly, the second wiring 92 is held in the deceleration mechanism case 13. An upper end 92a of the second wiring 92 protrudes from the bottom wall 15a toward the upper side. The upper end 92a of the second wiring 92 is connected to the lower end 91a of the first wiring 91. A lower end 92b of the second wiring 92 penetrates through the bottom 13j to protrude inside the first recess 17. The lower end 92b is equivalent to one end of the wirings 90. Accordingly, the wirings 90 penetrate through the case 11 from the inside of the case 11, and one end of the wirings 90 protrudes inside the first recess 17. As shown in FIGS. 4 and 5, the lower end 92b protrudes inside the terminal accommodator 17d from the bottom surface of the terminal accommodator 17d.

The rotation angle detecting device 60 is capable of detecting the rotation angle of a rotation body rotatable about the central axis J1. In the exemplary embodiment of the present disclosure, the rotation body is the outputter 40. That is, in the exemplary embodiment of the present disclosure, the rotation angle detecting device 60 is capable of detecting the rotation angle of the outputter 40. As shown in FIG. 3, the rotation angle detecting device 60 includes the first magnet 63, a cover 62, and the magnetic sensor 61. In addition, as shown in FIG. 4, the rotation angle detecting device 60 includes a pair of magnetic parts 67a and 67b.

Figure 6:
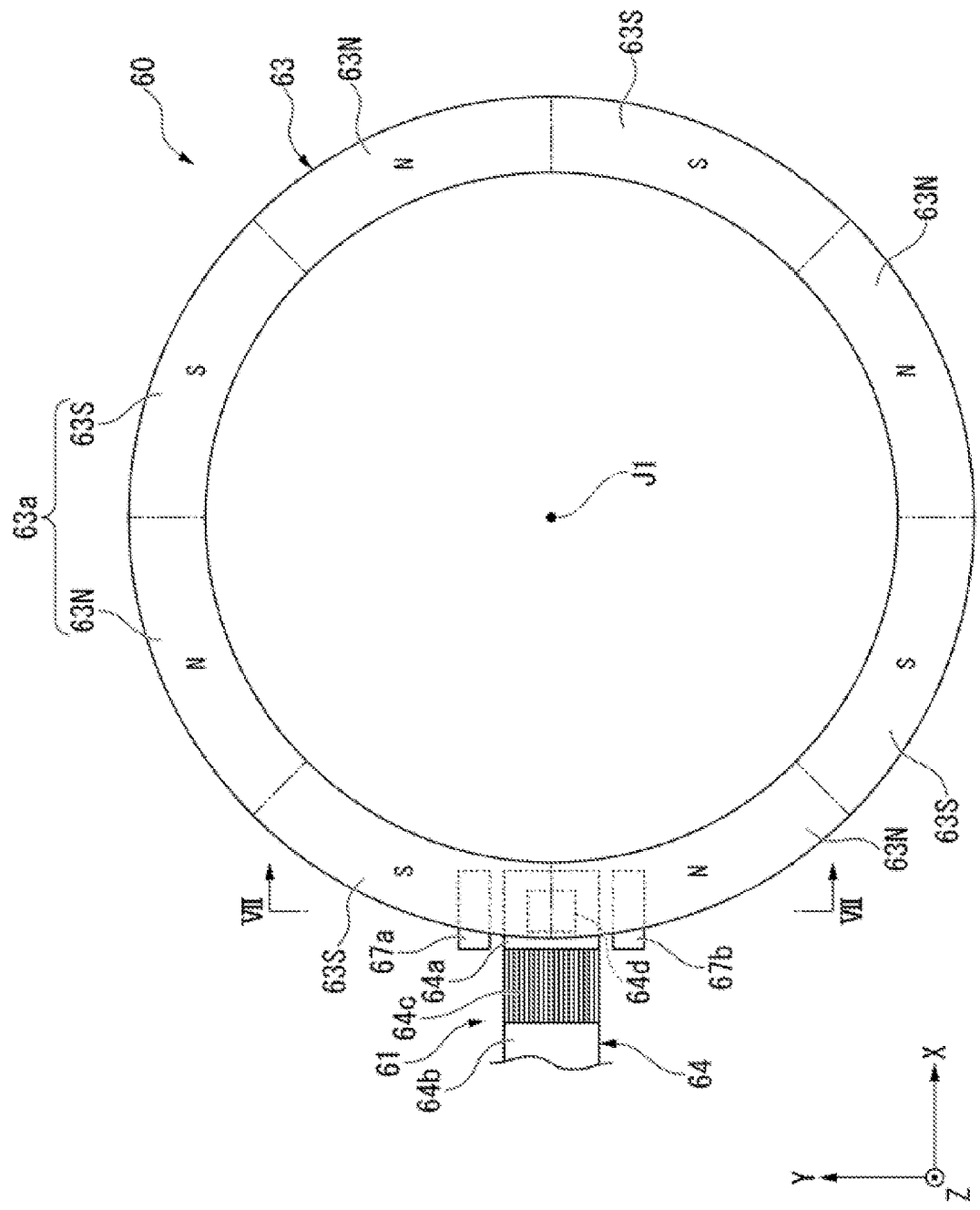
FIG. 6 is a view illustrating a portion of the rotation angle detecting device of the exemplary embodiment of the present disclosure from the upper side.

As shown in FIG. 6, the first magnet 63, for example, is in an annular or substantially annular shape with the central axis J1 as the center. The first magnet 63 has a plurality of magnetic poles 63a provided side-by-side in the circumferential direction about the central axis J1. The magnetic poles 63a include N poles 63N and S poles 63S. For example, 4 N poles 63N and S poles 63S are provided alternately along the circumferential direction. In the exemplary embodiment of the present disclosure, the first magnet 63 is equivalent to the sensor magnet installed to the outputter 40 as the rotation body. As shown in FIG. 3, the first magnet 63, for example, is fixed to the lower surface of the output flange 42. The first magnet 63, for example, is positioned on the lower side of the protrusion 32. The lower side end of the first magnet 63 faces the upper side of the annular part 16b via a gap.

In the exemplary embodiment of the present disclosure, the magnetic sensor 61 is positioned inside the first recess 17. When viewed in a predetermined first direction, the magnetic sensor 61 is overlapped with the first magnet 63. In the exemplary embodiment of the present disclosure, the predetermined first direction is the axial direction Z of the central axis J1. The magnetic sensor 61, for example, is positioned on the lower side of the first magnet 63 with the annular part 16b interposed in-between. The magnetic sensor 61 is capable of detecting the magnetic field of the first magnet 63. In the exemplary embodiment of the present disclosure, the magnetic sensor 61 is a Hall element. Therefore, it is easy to make the magnetic sensor 61 inexpensive. Accordingly, the manufacturing cost of the rotation angle detecting device 60 is able to be reduced. The magnetic sensor 61, for example, is a linear Hall IC.

By detecting the change of the magnetic field generated by the first magnet 63 rotating with the outputter 40, the magnetic sensor 61 is able to detect the rotation of the outputter 40. Here, according to the exemplary embodiment of the present disclosure, the cylinder 16 is non-magnetic. Therefore, even if the cylinder 16 is positioned between the first magnet 63 and the magnetic sensor 61, the accuracy of detecting the magnetic field of the first magnet 63 by the magnetic sensor 61 is able to be prevented from lowering.

As shown in FIG. 4, the magnetic sensor 61 has a sensor body 64, a first protrusion 65a, a second protrusion 65b, and a plurality of sensor terminals 66a, 66b, and 66c. The sensor body 64 extends in the horizontal direction X, and is in a rectangular parallelepiped or substantially rectangular parallelepiped shape flat in the axial direction Z. The sensor body 64 is accommodated in the first recess 17. More specifically, the sensor body 64 is accommodated in the body accommodator 17c. The sensor body 64 has an inner portion 64a, an outer portion 64b, and a connector 64c. The inner portion 64a is in a square or substantially square shape when viewed in the axial direction Z. A sensor chip 64d is provided inside the inner portion 64a.

As shown in FIG. 3, when viewed in the axial direction Z, the sensor chip 64d is overlapped with the first magnet 63. In the exemplary embodiment of the present disclosure, the sensor chip 64d is positioned on the lower side of the first magnet 63. The sensor chip 64d is capable of detecting the magnetic field generated by the first magnet 63. By using the sensor chip 64d to detect the change of the magnetic field generated by the first magnet 63 rotating with the outputter 40, the magnetic sensor 61 is able to detect the rotation of the outputter 40.

The outer portion 64b is positioned on the radially outer side of the inner portion 64a. When viewed in the axial direction Z, the outer portion 64b is in a square or substantially square shape. The outer portion 64b contacts the bottom surface 16f of the second recess 16e. That is, the magnetic sensor 61 contacts the bottom surface 16f of the second recess 16e. Therefore, the magnetic sensor 61 is able to be positioned in the axial direction Z according to the cylinder 16 made of metal. Accordingly, the magnetic sensor 61 is able to be provided with high positioning accuracy. As shown in FIG. 4, the sensor terminals 66a, 66b, and 66c are held in the outer portion 64b. The connector 64c connects the inner portion 64a and the outer portion 64b. The connector 64c is electrically connected with the sensor chip 64d and the sensor terminals 66a, 66b, and 66c.

The first protrusion 65a and the second protrusion 65b protrude from the sensor body 64 toward the horizontal direction Y orthogonal to the axial direction Z. The first protrusion 65a protrudes from the sensor body 64 toward a side (+Y side) of the horizontal direction Y. The second protrusion 65b protrudes from the sensor body 64 toward the other side (−Y side) of the horizontal direction Y. The first protrusion 65a and the second protrusion 65b are, for example, in a plate or substantially plate shape in which the plate surface is orthogonal to the axial direction Z.

Two first protrusions 65a are provided separately in the horizontal direction X. Two second protrusions 65b are provided separately in the horizontal direction X. The two first protrusions 65a are respectively positioned inside the two first protrusion accommodators 18a. The two second protrusions 65b are respectively positioned inside the two second protrusion accommodators 18b.

The sensor terminals 66a, 66b, and 66c extend from the sensor body 64 toward the radially outer side. The sensor terminals 66a, 66b, and 66c are accommodated in the terminal accommodator 17d. The sensor terminals 66a, 66b, and 66c are electrically connected to the sensor chip 64d via the connector 64c. The sensor terminals 66a, 66b, and 66c are provided side-by side along the horizontal direction Y. In the horizontal direction Y, the sensor terminal 66b is disposed between the sensor terminal 66a and the sensor terminal 66c. The sensor terminal 66b extends linearly along the horizontal direction X. The sensor terminals 66a and 66c are each provided with a first bent portion bent, from the sensor body 64 toward the radially outer side, toward the side away from the sensor terminal 66b in the horizontal direction Y and a second bent portion bent toward the side of the sensor terminal 66b on the radially outer side with respect to the first bent portion.

The sensor terminals 66a, 66b, and 66c are respectively connected with the lower ends of the second wirings 92. Accordingly, the magnetic sensor 61 is connected to one end of the wiring 90. In the exemplary embodiment of the present disclosure, the lower ends 92b are bifurcated, and the sensor terminals 66a, 66b, and 66c are sandwiched and held by the lower ends 92b. The sensor terminals 66a, 66b, and 66c are, for example, fixed to the lower ends 92 by welding.

As shown in FIG. 3, at least a portion of the magnetic sensor 61 is positioned inside the second recess 16e. According to the exemplary embodiment of the present disclosure, in the magnetic sensor 61, the upper side end of the inner portion 64a and the upper side end of the outer portion 64b are positioned inside the second recess 16e.

As shown in FIG. 6, the pair of magnetic parts 67a and 67b are provided to sandwich the magnetic sensor 61 in a second direction intersecting the axial direction Z which is the first direction. In the exemplary embodiment of the present disclosure, the second direction is the circumferential direction about the central axis J1. That is, in the exemplary embodiment of the present disclosure, the first direction and the second direction are directions orthogonal to each other. The second direction, for example, is the horizontal direction Y in the circumferential direction. The pair of magnetic parts 67a and 67b are, for example, provided to sandwich the inner portion 64a of the sensor body 64 in the horizontal direction Y in the circumferential direction. The pair of magnetic parts 67a and 67b are, for example, provided to sandwich the sensor chip 64d in the horizontal direction Y in the circumferential direction. The pair of magnetic parts 67a and 67b are, for example, provided to be away from the magnetic sensor 61.

The pair of magnetic parts 67a and 67b are, for example, in a rectangular parallelepiped or substantially rectangular parallelepiped shape. The shape of the magnetic part 67a and the shape of the magnetic part 67b are, for example, the same as each other. As shown in FIG. 4, in the exemplary embodiment of the present disclosure, the magnetic part 67a is accommodated in the accommodating recess 19a. The magnetic part 67a, for example, is fit in the accommodating recess 19a. The lower side surface of the magnetic part 67a is provided, for example, at the same position as the bottom surface of the first portion 17a in the axial direction Z. In the exemplary embodiment of the present disclosure, the magnetic part 67b is accommodated in the accommodating recess 19b. The magnetic part 67b, for example, is fit in the accommodating recess 19b. The lower side surface of the magnetic part 67b is provided, for example, at the same position as the bottom surface of the first portion 17a in the axial direction Z.

Figure 7:
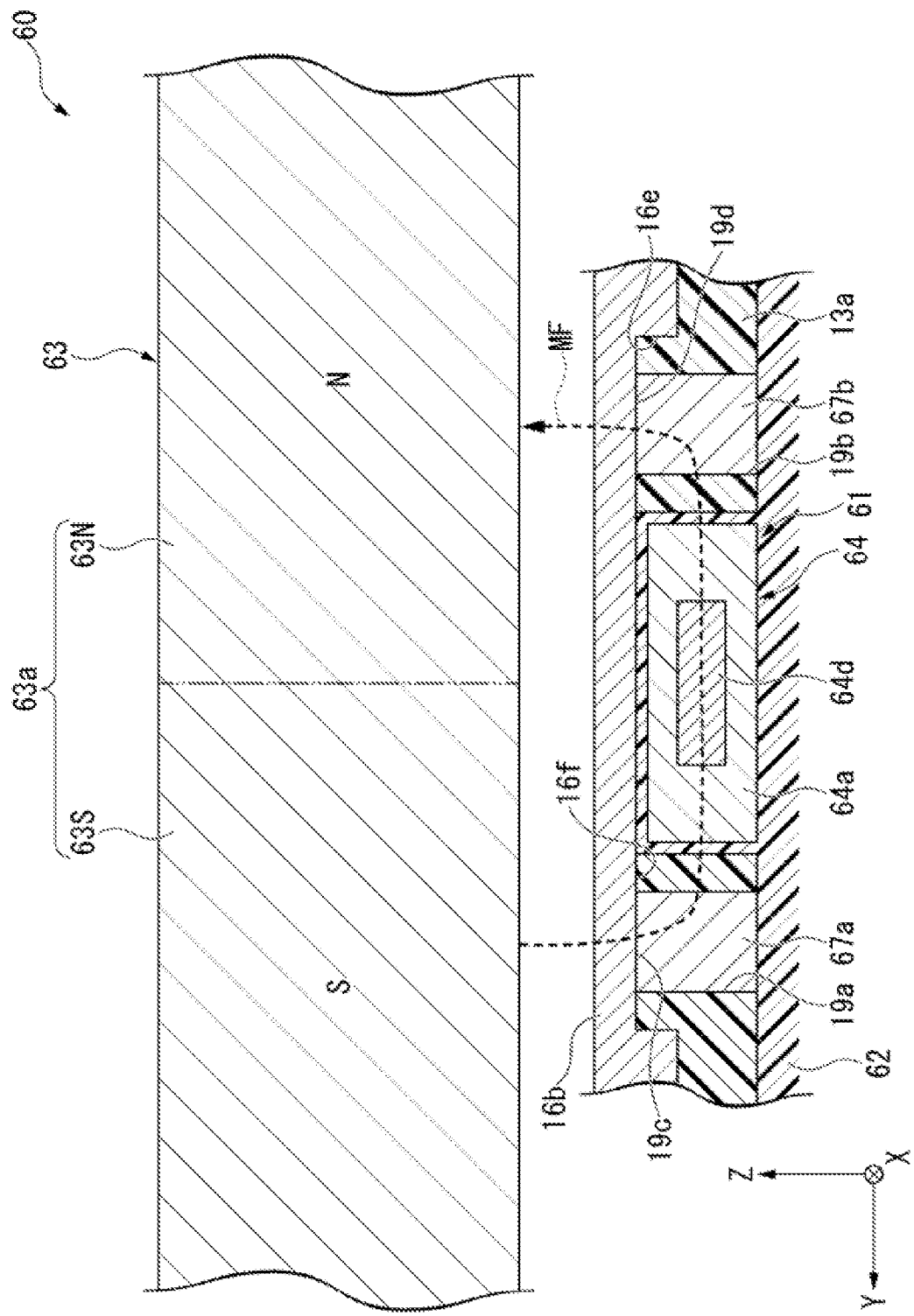
FIG. 7 is a cross-sectional view illustrating a portion of the rotation angle detecting device according to the exemplary embodiment of the present disclosure, and is a cross-sectional view taken along III-III in FIG. 6.

As shown in FIG. 7, the upper side ends of the pair of magnetic parts 67a and 67b are positioned in the second recess 16e, for example. The upper side surface of the magnetic part 67a, for example, contacts the bottom surface 19c of the accommodating recess 19a. The upper side surface of the magnetic part 67b, for example, contacts the bottom surface 19d of the accommodating recess 19b. As described above, the bottom surfaces 19c and 19d of the accommodating recesses 19a and 19b include the bottom surface 16f of the second recess 16e. That is, the pair of magnetic parts 67a and 67b contact the bottom surface 16f of the second recess 16e. Therefore, the pair of magnetic parts 67a and 67b is able to be positioned in the axial direction Z according to the cylinder 16 made of metal. Accordingly, the pair of magnetic parts 67a and 67b is able to be provided with high positioning accuracy.

The material for the pair of magnetic parts 67a and 67b is not particularly limited, as long as the material is magnetic. For example, the material for the pair of magnetic parts 67a and 67b may be the same as the material for the rotor core of the rotor body 22, and may also be the same as the material for the stator core 24. The material for the magnetic part 67a and the material for the magnetic part 67b may be the same as each other, and may also be different from each other.

As shown in FIG. 3, the cover 62 is positioned inside the first recess 17. The cover 62, for example, fills the entirety of the inside of the first recess 17. The cover 62 is made of resin. The lower ends 92b of the second wirings 92, that is, one end of the wirings 90, and the magnetic sensor 61 are embedded in and covered by the cover 62. Therefore, moisture, etc., is able to be prevented from contacting the one end of the wirings 90 and the magnetic sensor 61 positioned in the first recess 17.

As shown in FIG. 7, the cover 62, for example, covers the entirety of the lower side surfaces of the magnetic parts 67a and 67b accommodated in the accommodating recesses 19a and 19b. The cover 62 supports the magnetic parts 67a and 67b from the lower side. Accordingly, the magnetic parts 67a and 67b is able to be prevented from falling out toward the lower side from the accommodating recesses 19a and 19b.

Here, in the case where the magnetic sensor 61 is overlapped with the first magnet 63 when viewed in the predetermined first direction, the magnetic flux released by the first magnet 63 may easily pass through the magnetic sensor 61 along the predetermined first direction. However, in the second direction intersecting the first direction, the magnetic flux released by the first magnet 63 61 may have difficulty in passing through the magnetic sensor 61. Specifically, according to the exemplary embodiment of the present disclosure, the magnetic flux 63 released from the first magnet 63 may easily pass through the magnetic sensor 61 along the axial direction Z while having difficulty in passing along the circumferential direction intersecting the axial direction Z. Therefore, in the conventional configuration, a bias is present between the magnitude of the magnetic flux density of the axial direction Z and the magnitude of the magnetic flux density of the circumferential direction detected by the magnetic sensor 61, and the value of arctan in the composite vector of the magnetic flux densities of the two directions detected by the magnetic sensor 61 may easily change from a linear form to a greatly distorted form with respect to the rotation angle of the outputter 40. Accordingly, to detect the rotation angle of the outputter 40, it is necessary to perform a correction process to make the detected magnetic flux densities relatively greater. Therefore, the error of the detected rotation angle of the outputter 40 may easily increase, and the detection accuracy of the rotation angle detecting device may decrease. In addition, the computational load required for detecting the rotation angle of the outputter 40 by using the rotation angle detecting device may increase.

With respect to this, according to the exemplary embodiment of the present disclosure, the rotation angle detecting device 60 includes the pair of magnetic parts 67a and 67b provided to sandwich the magnetic sensor 61 in the second direction, i.e., the circumferential direction in the exemplary embodiment of the present disclosure, intersecting the first direction. Therefore, as indicated by an arrow sign MF in a broken line shown in FIG. 7, the magnetic flux from the first magnet 63 may easily flow from one of the pair of magnetic parts 67a and 67b to the other. Therefore, with respect to the magnetic sensor 61, the pair of magnetic parts 67a and 67b is able to sandwich the magnetic sensor 61 and make the magnetic flux flow in the second direction easily. Accordingly, the magnitude of the magnetic flux density passing through the magnetic sensor 61 in the second direction, i.e., the circumferential direction, is able to be increased. Therefore, the magnitude of the magnetic flux density in the axial direction Z and the magnitude of the magnetic flux density in the circumferential direction detected by the magnetic sensor 61 may easily be at the same level of magnitude. Therefore, the value of arctan in the composite vector of the magnetic flux density in the axial direction Z and the magnetic flux density in the circumferential direction detected by the magnetic sensor 61 is able to change in a nearly linear form with respect to the rotation angle of the outputter 40. Accordingly, the correction amount of the correction process applied to the detect magnetic flux density is able to be decreased. Therefore, the error of the detected rotation angle of the outputter 40 is able to be decreased, and the detection accuracy of the rotation angle detecting device 60 is able to be increased. In addition, the computational load required for detecting the rotation angle of the outputter 40 by using the rotation angle detecting device 60 is able to be reduced. Accordingly, the rotation angle of the outputter 40 in the electric actuator 10 is able to be accurately and easily detected.

Figure 8:
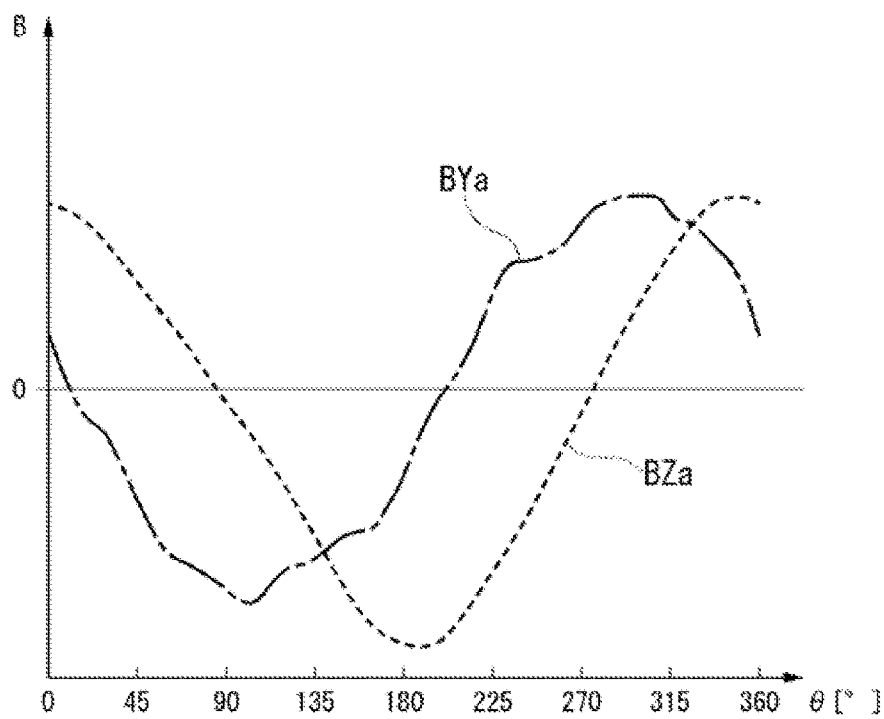
FIG. 8 is a graph illustrating an example of a waveform of a magnetic flux density detected by the rotation angle detecting device of the exemplary embodiment of the present disclosure.
Figure 9:
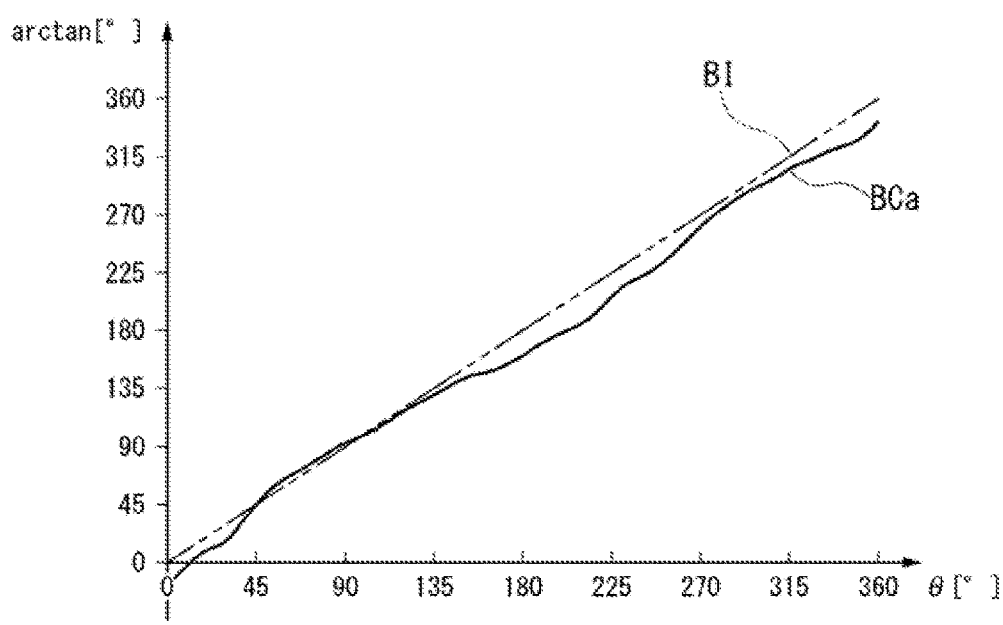
FIG. 9 is a graph illustrating an example of a waveform of arctan in a composite vector obtained based on the magnetic flux density detected by the rotation angle detecting device according to the exemplary embodiment of the present disclosure.
Figure 11:
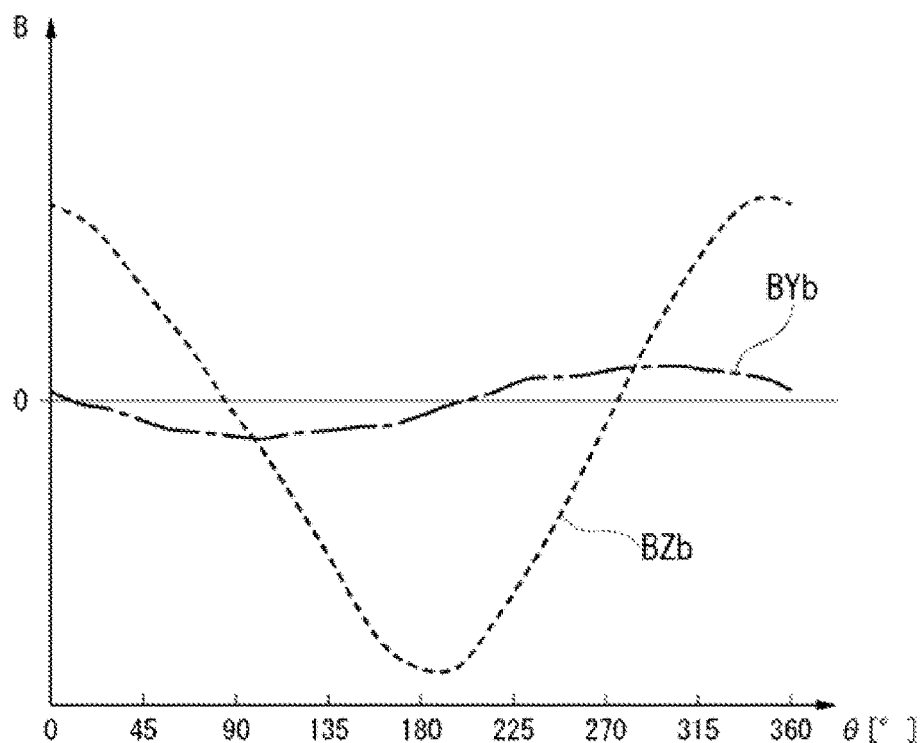
FIG. 11 is a graph illustrating an example of a waveform of a magnetic flux density detected by a rotation angle detecting device of a comparative example.
Figure 12:
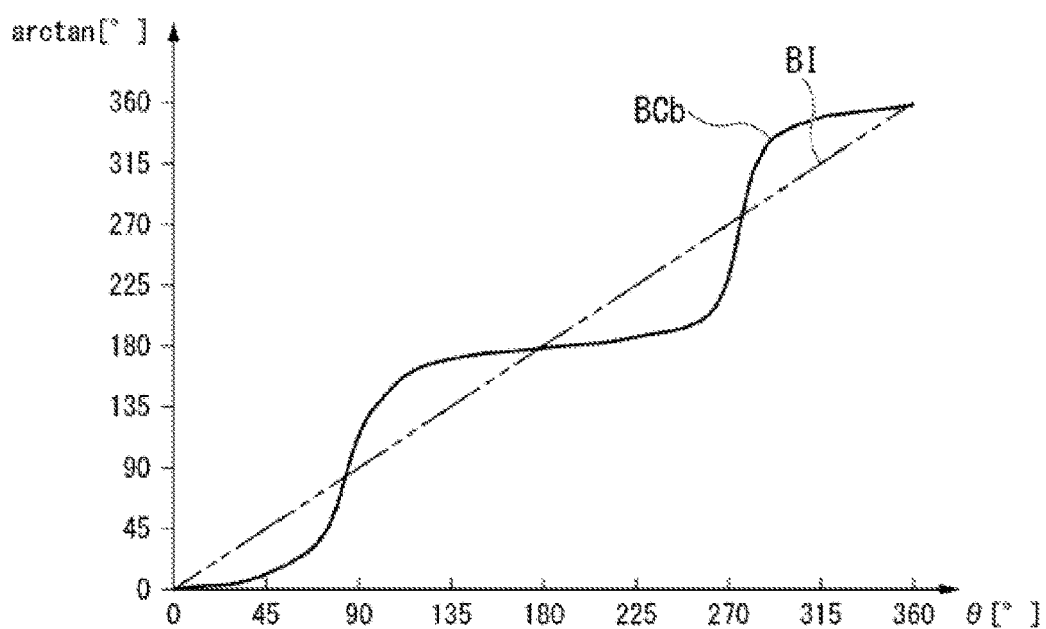
FIG. 12 is a graph illustrating an example of a waveform of arctan in a composite vector obtained based on the magnetic flux density detected by the rotation angle detecting device of the comparative example.

FIG. 8 is a graph illustrating an example of a waveform of a magnetic flux density B detected by the rotation angle detecting device 60 of the exemplary embodiment of the present disclosure. FIG. 9 is a graph illustrating an example of a waveform of arctan in a composite vector obtained based on the magnetic flux density B detected by the rotation angle detecting device 60 according to the exemplary embodiment of the present disclosure. FIG. 11 is a graph illustrating an example of a waveform of the magnetic flux density B detected by a rotation angle detecting device of a comparative example. FIG. 12 is a graph illustrating an example of a waveform of arctan in a composite vector obtained based on the magnetic flux density B detected by the rotation angle detecting device of the comparative example. Except for not being provided with the pair of magnetic parts 67a and 67b, the rotation angle detecting device of the comparative example shown in FIGS. 11 and 12 have the same configuration as the rotation angle detecting device 60 of the exemplary embodiment of the present disclosure. In FIG. 8 and FIG. 11, the vertical axis represents the magnetic flux density B, and the horizontal axis represents a rotation angle θ of the outputter 40. In FIG. 9 and FIG. 12, the vertical axis represents the value of arctan, and the horizontal axis represents the rotation angle θ of the outputter 40.

As shown in FIG. 11, in the rotation angle detecting device of the comparative example, the amplitude in the waveform of a magnetic flux density BYb of the circumferential direction (horizontal direction Y) is smaller than the amplitude in the waveform of a magnetic flux density BZb of the axial direction Z, and the difference between the amplitude of the waveform of the magnetic flux density BZb and the amplitude of the waveform of the magnetic flux density BYb is large. In this case, as shown in FIG. 12, a composite waveform BCb obtained based on the magnetic flux density BZb and the magnetic flux density BYb is in a greatly distorted form with respect to an ideal line BI. The composite waveform BCb is a waveform showing changes of the value of arctan with respect to the rotation angle θ in the comparative example. The value of arctan in the comparative example is a value of arctan of the composite vector combining the vector of the magnetic flux density BZb of the axial direction Z and the vector of the magnetic flux density BYb of the circumferential direction. The composite waveform BCb in FIG. 12 is in a largely corrugated form with respect to the ideal line BI.

The ideal line BI illustrates the case in which the value of arctan of the composite vector ideally changes linearly with respect to the rotation angle θ of the outputter 40. The value of arctan is, for example, proportional to the rotation angle θ, in the ideal line BI. In the ideal line BI, for example, the value of arctan of a certain rotation angle θ is the same as the value of this rotation angle θ. That is, in the case where the value of arctan changes with respect to the rotation angle θ in the way of the ideal line BI, the value of arctan is able to be obtained as it is as the value of the rotation angle θ to be detected.

As shown in FIG. 8, in the rotation angle detecting device 60, with the pair of magnetic parts 67a and 67b, the amplitude of the waveform of a magnetic flux density BYa of the circumferential direction (horizontal direction Y) is able to be greater than the amplitude of the waveform of the magnetic flux density BYb shown in FIG. 11. Therefore, the amplitude of the waveform of the magnetic flux density BYa of the circumferential direction (horizontal direction Y) detected by the magnetic sensor 61 is able to be at the same level of the amplitude of the waveform of the magnetic flux density BZa of the axial direction Z detected by the magnetic sensor 61. Accordingly, the value of arctan in the composite vector combining the vector of the magnetic flux density BZa and the vector of the magnetic flux density BYz may easily change linearly with respect to the rotation angle θ. Therefore, as shown in FIG. 9, the composite waveform BCa representing the change of arctan with respect to the rotation angle θ of the exemplary embodiment of the present disclosure is able to be close to the ideal line BI. Therefore, the correction amount of the correction process applied to the detected magnetic flux density B is able to be decreased, and the error of the detected rotation angle θ is able to be reduced. Therefore, the detection accuracy of the rotation angle detecting device 60 is able to be increased, and the computational load required for detecting the rotation angle θ is able to be reduced.

In addition, according to the exemplary embodiment of the present disclosure, the axial direction Z as the first direction and the circumferential direction as the second direction are directions orthogonal to each other. Here, in general, when arctan is calculated to obtain the rotation angle θ, it is easy to appropriately obtain the rotation angle θ by setting the value of arctan as the value of the composite vector of the magnetic flux densities in two directions orthogonal to each other. Therefore, by making the second direction in which the pair of magnetic parts 67a and 67b sandwich the magnetic sensor 61 orthogonal to the first direction in which the magnetic sensor 61 and the first magnet are provided in a line, the value of arctan is able to be appropriately calculated from the magnetic flux densities of the two directions orthogonal to each other that are detected by the magnetic sensor 61, and the rotation angle θ is able to be easily detected. Accordingly, the detection accuracy of the rotation angle detecting device 60 is able to be further increased, and the computational load required for detecting the rotation angle θ is able to be further reduced.

In addition, according to the exemplary embodiment of the present disclosure, the cover 62 supports the magnetic parts 67a and 67b. Therefore, the magnetic parts 67a and 67b is able to be supported by using the cover 62 covering the magnetic sensor 61. Therefore, it is not necessary to separately provide a component for supporting the pair of magnetic parts 67a and 67b in addition to the cover 62, and the increase in the number of components of the rotation angle detecting device 60 is able to be suppressed.

In addition, according to the exemplary embodiment of the present disclosure, the magnetic sensor 61 is able to be connected with the wirings 90 in the first recess 17 positioned on the outer side surface of the case 11. Therefore, a space in which the sensor terminals 66a, 66b, and 66c of the magnetic sensor 61 are connected with the wirings 90 is able to be secured outside the case 11. Accordingly, compared with the case where the magnetic sensor 61 is provided inside the case 11, the man-hours as well as the time required for the operation of connecting the sensor terminals 66a, 66b, and 66c with the wirings 90 is able to be reduced. Therefore, the man-hours as well as the time for providing the magnetic sensor 61 is able to be reduced, and the productivity of the electric actuator 10 is able to be facilitated.

In addition, according to the exemplary embodiment of the present disclosure, the outputter 40 is accommodated in the deceleration mechanism case 13, and the first recess 17 is provided in the deceleration mechanism case 13. Therefore, it is easy to bring the magnetic sensor 61 closer to the first magnet 63 installed to the outputter 40. Accordingly, the magnetic sensor 61 is able to more easily detect the magnetic field of the first magnet 63. Therefore, the detection accuracy of the rotation angle detecting device 60 is able to be further increased.

In addition, according to the exemplary embodiment of the present disclosure, the deceleration mechanism case 13 is provided with the cylinder 16 embedded into the deceleration mechanism case 13. Therefore, when the magnetic sensor 61 is provided inside the deceleration mechanism case 13, due to the interference of the cylinder 16, it is difficult to perform the operation of connecting the sensor terminals 66a, 66b, and 66c with the wirings 90. Therefore, the capability of reducing the man-hours as well as time for the operation of connecting the sensor terminals 66a, 66b, and 66c with the wirings 90 is particularly useful in a configuration in which the cylinder 16 is provided.

In addition, according to the exemplary embodiment of the present disclosure, at least a portion of the magnetic sensor 61 is positioned inside the second recess 16e. Therefore, the position of the magnetic sensor 61 in the axial direction Z is able to be brought closer to the first magnet 63 on the upper side. Accordingly, the magnetic sensor 61 is able to more easily detect the magnetic field of the first magnet 63. Therefore, the detection accuracy of the rotation angle detecting device 60 is able to be further increased.

Moreover, for example, in the case where the dimension of the portion of the annular part 16b in which the second recess 16e is provided in the axial direction Z is the same as the dimension of the other portion of the annular part 16b in the axial direction Z, the portion of the annular part 16b in which the second recess 16e is provided protrudes toward the upper side. As a result, the protruding portion of the annular part 16b is brought closer to the first magnet 63, and there is a concern that the annular part 16b may contact the first magnet 63. Regarding this, according to the exemplary embodiment of the present disclosure, the portion of the annular part 16b in which the second recess 16e is provided has a smaller dimension in the axial direction Z than the other portion of the annular part 16b. Therefore, in the exemplary embodiment of the present disclosure, the second recess 16e is able to be provided while the upper side surface of the annular part 16b is a flat surface. Accordingly, the second recess 16e is able to be provided to bring the magnetic sensor 61 closer to the first magnet 63 while the contact of the annular part 16b with the first magnet 63 is able to be suppressed.

Moreover, according to the exemplary embodiment of the present disclosure, in the magnetic sensor 61, the upper side end of the inner portion 64a and the upper side end of the outer portion 64b are positioned inside the second recess 16e. By positioning a portion of the inner portion 64a inside the second recess 16e, the sensor chip 64d provided inside the inner portion 64a is able to be brought even closer to the first magnet 63. Therefore, the magnetic sensor 61 is able to appropriately detect the magnetic field of the first magnet 63. Therefore, the detection accuracy of the rotation angle detecting device 60 is able to be appropriately increased further.

In addition, according to the exemplary embodiment of the present disclosure, the inner diameter of the through hole 12h is greater than the outer diameter of the holder tube 101, and at least a portion of the radially outer side surface of the holder tube 101 in the circumferential direction is positioned at a position closer to the radially inner side than the radially inner side surface of the through hole 12h. Therefore, before being fixed to the wall 12b, the bearing holder 100 is able to be moved in the radial direction by the amount of the gap between the radially inner side surface of the through hole 12h and the radially outer side surface of the holder tube 101. Accordingly, the position of the first bearing 51 with respect to the motor case 12 in the radial direction is able to be adjusted. Therefore, for example, even when the position of the second bearing 52 in the radial direction with respect to the motor case 12 is shifted due to an assembling error, etc., the position of the first bearing 51 in the radial direction is able to match the position of the second bearing 52 in the radial direction, and the first bearing 51 and the second bearing 52 is able to be provided with high axial accuracy. As a result, the inclination of the motor shaft 21 supported by the first bearing 51 and the second bearing 52 is able to be suppressed, and the axial accuracy of the motor shaft 21 is able to be facilitated. Accordingly, the increase in noise and vibration generated by the electric actuator 10 is able to be suppressed.

While the respective drawings show that the center of the holder tube 101 and the center of the through hole 12h coincide with the central axis J1, and the entire circumference of the radially outer side surface of the holder tube 101 is closer to the radially inner side than the radially inner side surface of the through hole 12h, the disclosure is not limited thereto. Depending on the adjustment amount of the position of the bearing holder 100 in the radial direction, the center of the through hole 12h may not coincide with the central axis J1. In addition, a portion of the radially outer side surface of the holder tube 101 may contact the radially inner side surface of the through hole 12h.

Also, according to the exemplary embodiment of the present disclosure, the second bearing 52 connects the motor shaft 21 and the output shaft 41 to be rotatable with each other. Therefore, by increasing the axial accuracy of the first bearing 51 and the second bearing 52, the axial accuracy of the motor shaft 21 and the output shaft 41 is able to be facilitated.

In addition, when the motor shaft 21 and the output shaft 41 are connected by the second bearing 52, the second bearing 52 is indirectly supported with respect to the deceleration mechanism case 13 via the output shaft 41. Therefore, compared with the case where the second bearing 52 is directly supported with respect to the deceleration mechanism case 13, the position of the second bearing 52 may easily become unstable, and the axis of the motor shaft 21 may be shaken easily. Regarding this, according to the exemplary embodiment of the present disclosure, since the axial accuracy of the motor shaft 21 is able to be facilitated as the above, the shaking of the axis of the motor shaft 21 is able to be suppressed. That is, when the motor shaft 21 and the output shaft 41 are connected by the second bearing 52, the axial accuracy of the motor shaft 21 in the exemplary embodiment of the present disclosure is able to be obtained more usefully.

The disclosure is not limited to the above exemplary embodiment of the present disclosure. Other configurations may also be adopted. The magnetic sensor of the rotation angle detecting device may be any kind of magnetic sensor. The rotation angle detecting device may include multiple magnetic sensors. The shapes of the pair of magnetic parts are not particularly limited. The shapes of the pair of magnetic parts may be shapes different from each other. The shapes of the pair of magnetic sensors may also be shapes like those of a pair of magnetic parts 167a and 167b in a rotation angle detecting device 160 shown in FIG. 10.

Figure 10:
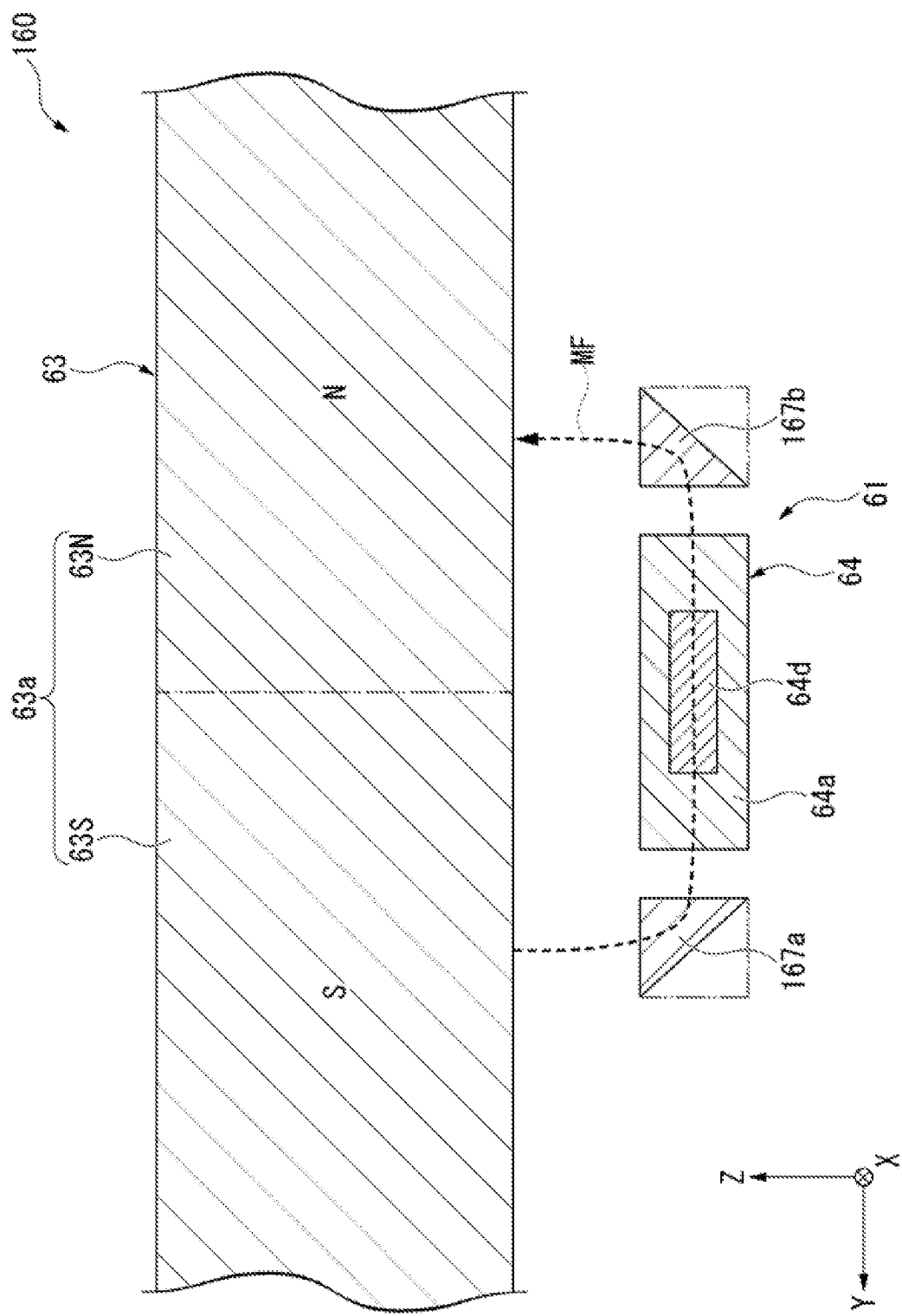
FIG. 10 is a cross-sectional view illustrating a portion of a rotation angle detecting device in a modified example of the exemplary embodiment of the present disclosure.

As shown in FIG. 10, when viewed in the horizontal direction X, the pair of magnetic parts 167a and 167b sandwich the magnetic sensor 61 and are in symmetrical or substantially symmetrical shapes in the horizontal direction Y, for example. The pair of magnetic parts 167a and 167b are each in a shape in which, when viewed in the horizontal direction X, among the four corners of a rectangle represented by a portion of the outline of the magnetic part 167a/167b and two-dot chain lines, the corner on a side (−Z side) opposite to the side where the first magnet 63 is positioned in the axial direction Z and a side opposite to the side where the magnetic sensor 61 is positioned in the circumferential direction (horizontal direction Y) is cut off from the rectangle. The pair of magnetic parts 167a and 167b are each substantially in a shape in which a portion on a side away from the first magnet 63 and a portion on a side away from the magnetic sensor 61 are cut off from a square-column-shaped or substantially square-column-shaped magnetic part. In FIG. 10, the pair of magnetic parts 167a and 167b are, for example, in triangular or substantially triangular shapes when viewed in the horizontal direction X. The pair of magnetic parts 167a and 167b are, for example, in triangular columnar or substantially triangular columnar shapes. In the configuration of FIG. 10, the horizontal direction X is a direction of the radial direction, and is equivalent to a third direction orthogonal to the first direction and the second direction.

In the case where the magnetic part is in a rectangular or substantially rectangular shape when viewed in the horizontal direction X, as indicated by an arrow sign MF in a broken line in FIG. 10, the magnetic flux from the first magnet 63 has difficulty in flowing at the corner on the side (−Z side) opposite to the side where the first magnet 63 is positioned in the axial direction Z and the side opposite to the side where the magnetic sensor 61 is positioned in the circumferential direction (horizontal direction Y) among the four corners in the rectangle. Therefore, even if the shapes of the magnetic parts 167a and 167b when viewed in the horizontal direction X are shapes in which the corners are cut off from the rectangles as shown in the configuration of FIG. 10, it is unlikely to affect the magnetic flux of the magnetic sensor 61 flowing in the circumferential direction. Meanwhile, since the volumes of the magnetic parts 167a and 167b is able to be reduced, the manufacturing cost of the magnetic parts 167a and 167b is able to be reduced. Besides, the magnetic parts 167a and 167b may have rounded shapes in which the cut corners are rounded and chamfered.

It is sufficient as long as the second direction in which the pair of magnetic parts sandwich the magnetic sensor intersect the predetermined first direction, and the second direction may also be a direction not orthogonal to the first direction. The predetermined first direction is not particularly limited, and may also be a direction different from the axial direction of the central axis of the rotation body. In a machine in which the rotation angle detecting device is installed, the pair of magnetic parts may be fixed in any arbitrary manner. Multiple pairs of magnetic parts may also be provided. In such case, multiple pairs of magnetic parts may be provided for one magnetic sensor, or multiple pairs of magnetic parts may be respectively provided for multiple magnetic sensors. The cover may also not support the magnetic parts. In such case, a component that supports the magnetic parts may be provided separately. The sensor magnet whose magnetic field is detected by the magnetic sensor may be in any arbitrary shape, as long as the sensor magnet is provided with multiple magnetic poles provided side-by side in the circumferential direction.

The applications of the rotation angle detecting device for which the disclosure is suitable, and the applications and the structures of the electric actuator in which the rotation angle detecting device is mounted are not particularly limited. For example, the electric actuator in which the rotation angle detecting device is mounted may have a structure in which the motor shaft and the output shaft are separated in the axial direction. For example, the rotation angle detecting device may also be capable of detecting the rotation angle of the motor in the electric actuator, that is, the rotation angle of the motor shaft 21 in the exemplary embodiment of the present disclosure. The rotation angle detecting device may also be mounted in a machine other than an electric actuator. The rotation angle detecting device and the electric actuator may be mounted in a vehicle, and may also be mounted in a machine other than a vehicle, for example.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotation angle detecting device, capable of detecting a rotation angle of a rotation body rotatable about a central axis, the rotation angle detecting device comprising:
   a sensor magnet, having a plurality of magnetic poles provided side-by side in a circumferential direction about the central axis and installed to the rotation body;
   a magnetic sensor, overlapped with the sensor magnet when viewed in a predetermined first direction and capable of detecting a magnetic field of the sensor magnet; and
   a pair of magnetic parts, provided to sandwich the magnetic sensor in a second direction intersecting the first direction,
   wherein the first direction and the second direction are directions orthogonal to each other,
   wherein the first direction is an axial direction of the central axis, and the second direction is the circumferential direction about the central axis.

2. The rotation angle detecting device as claimed in claim 1, further comprising a cover made of resin,
   wherein the magnetic sensor is embedded into the cover to be covered.

3. The rotation angle detecting device as claimed in claim 2, wherein the cover supports the magnetic parts.

4. The rotation angle detecting device as claimed in claim 1, wherein the magnetic sensor is a Hall element.

5. The rotation angle detecting device as claimed in claim 1, wherein the pair of magnetic parts are each in a shape in which, when viewed in a third direction orthogonal to both the first direction and the second direction, among four corners of a rectangle, a corner positioned on a side opposite to a side where the sensor magnet is positioned in the first direction and a side opposite to a side where the magnetic sensor is positioned in the second direction is cut off from the rectangle.

6. An electric actuator, comprising the rotation angle detecting device as claimed in claim 1.

7. The electric actuator as claimed in claim 6, comprising:
   a motor;
   a deceleration mechanism, connected to the motor; and an outputter, transmitting rotation of the motor via the deceleration mechanism, wherein the rotation angle detecting device is capable of detecting a rotation angle of the outputter.

* * * * *